US012744676B1

(12) United States Patent
Devarajan et al.

(10) Patent No.: US 12,744,676 B1
(45) Date of Patent: Sep. 22, 2026

(54) SECURING DYNAMIC HOST CONTROL PROTOCOL

(71) Applicant: Amazon Technologies, Inc., Seattle, WA (US)

(72) Inventors: Vivek Krishnan Devarajan, Seattle, WA (US); Luis Fernando Gonzalez Fernandez, Seattle, WA (US); Tuhin Gupta, Seattle, WA (US); William Bennett, Omaha, NE (US); Lee Douglas Goodrich, Seattle, WA (US); Joseph Papa, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 158 days.

(21) Appl. No.: 18/622,331

(22) Filed: Mar. 29, 2024

(51) Int. Cl.
*H04L 9/40* (2022.01)
*H04L 9/08* (2006.01)
*H04L 9/32* (2006.01)

(52) U.S. Cl.
CPC .......... *H04L 9/3247* (2013.01); *H04L 9/0877* (2013.01); *H04L 63/0876* (2013.01); *H04L 9/0866* (2013.01)

(58) Field of Classification Search
CPC .......................... H04L 63/0876; H04L 9/0866
See application file for complete search history.

(56) References Cited

U.S. PATENT DOCUMENTS 8,874,703 B1 * 10/2014 Worsley ................ H04L 63/123 709/221
11,870,768 B1 * 1/2024 Vishwakarma ......... H04W 8/26
2009/0041252 A1 * 2/2009 Hanna ..................... H04L 63/12 380/278
2014/0283099 A1 * 9/2014 Smith ..................... G06F 11/00 726/26
2016/0261565 A1 * 9/2016 Lorenz .................. H04L 63/061
2022/0292203 A1 * 9/2022 Severns-Williams ........................ G06F 21/57

(Continued)

OTHER PUBLICATIONS

Droms, et al. "Authentication for DHCP Messages", Retrieved on Jan. 19, 2024 at <<https://datatracker.ietf.org/doc/html/rfc3118 >>, 17 pages.

(Continued)

*Primary Examiner* — David J Pearson
(74) *Attorney, Agent, or Firm* — Perilla Knox & Hildebrandt LLP; Thomas B. Hildebrandt

(57) ABSTRACT

Techniques for securing DHCP communications between DHCP servers and client devices in a network to authenticate the devices before providing IP addresses. A client device may store one-time programmable (OTP) seed parameters, and use the OTP seed parameters to derive a unique private key. The private key is used to sign payloads of each DHCP packet sent to the DHCP server. The DHCP server is provided with a public key that verifies signatures made using the private key, and is also provided a list of unique identifiers for client devices that are permitted into the network. The DHCP server uses the public key to verify signatures on DHCP packets, and further verifies that the unique identifier in the DHCP packets is included in the list of expected unique identifiers. Firmware code measurements can be sent in the DHCP packets for the DHCP server to authenticate firmware of the client device.

20 Claims, 14 Drawing Sheets

(56) References Cited

U.S. PATENT DOCUMENTS

2023/0125912 A1* 4/2023 Subramani Jayavelu .................. H04L 61/2514 709/201
2024/0214807 A1* 6/2024 Rivera .................. H04L 9/3268

OTHER PUBLICATIONS

Joens, et al., “DHCP reconfigure extension”, Retrieved on Jan. 19, 2024 at <<https://datatracker.ietf.org/doc/html/rfc3203>>, 6 pages.

* cited by examiner

300

DHCP SERVER 122

NIC 116

PROCESSOR(S) 302

NETWORK INTERFACE(S) 304

COMPUTER-READABLE MEDIA 306

DHCP CLIENT 308

SYSTEM-ON-A-CHIP (SOC) 310

PROCESSOR(S) 312

FUSE ARRAY 208

OTP SEED PARAMETERS 210

HARDWARE ID 136

COMPUTER-READABLE MEDIA 314

OPERATING SYSTEM 316

BOOT ROM 318

FIRMWARE 320

CRYPTOGRAPHIC KEY INFRASTRUCTURE 322

STORAGE 324

PUBLIC KEY IDS 134

PRIVATE KEY 130

FIRMWARE MEASUREMENTS 214

DHCP SERVER 122

PROCESSOR(S) 326

NETWORK INTERFACE(S) 328

COMPUTER-READABLE MEDIA 330

OPERATING SYSTEM 334

REQUEST DAEMON 336

REQUEST-HANDLING COMPONENT 338

LEASE-MANAGEMENT COMPONENT 340

CRYPTOGRAPHIC KEY INFRASTRUCTURE 342

FIRMWARE-VALIDATION COMPONENT 348

STORAGE 344

PUBLIC KEYS 140

HARDWARE ID LISTING 142

FIRMWARE MEASUREMENTS 214

IP ADDRESS POOLS 346

NETWORK INTERFACE CARDS (NICS) 116

SERVER 114

RECEIVE A LIST OF UNIQUE HARDWARE IDENTIFIERS (IDS) ASSOCIATED WITH A HARDWARE CHIPS IN THE NETWORK DEVICES THAT ARE PERMITTED TO BE CONNECTED TO A NETWORK ASSOCIATED WITH THE DHCP SERVER
802

RECEIVE, FROM A NETWORK DEVICE, ONE OR MORE FIRST SIGNED DHCP PACKETS WITH AUTHENTICATION DATA INCLUDING (I) A UNIQUE HARDWARE IDENTIFIER (ID) ASSOCIATED WITH A HARDWARE CHIP IN THE NETWORK DEVICE AND (II) A PUBLIC KEY ID THAT INDICATES A PUBLIC KEY CORRESPONDING TO THE PRIVATE KEY
804

USING THE PUBLIC KEY ID, RETRIEVING A PUBLIC KEY THAT CORRESPONDS TO A PRIVATE KEY THAT WAS USED TO SIGN THE ONE OR MORE FIRST SIGNED DHCP PACKETS
806

USING THE PUBLIC KEY, VERIFYING THAT A SIGNATURE ON THE ONE OR MORE FIRST SIGNED DHCP PACKETS WAS GENERATED USING THE PRIVATE KEY
808

AUTHENTICATE THE HARDWARE CHIP BY DETERMINING THAT THE UNIQUE HARDWARE ID IS INCLUDED IN THE LIST OF UNIQUE HARDWARE IDS
810

SEND, TO THE END DEVICE, A SECOND DHCP PACKET INDICATING AN IP ADDRESS
812

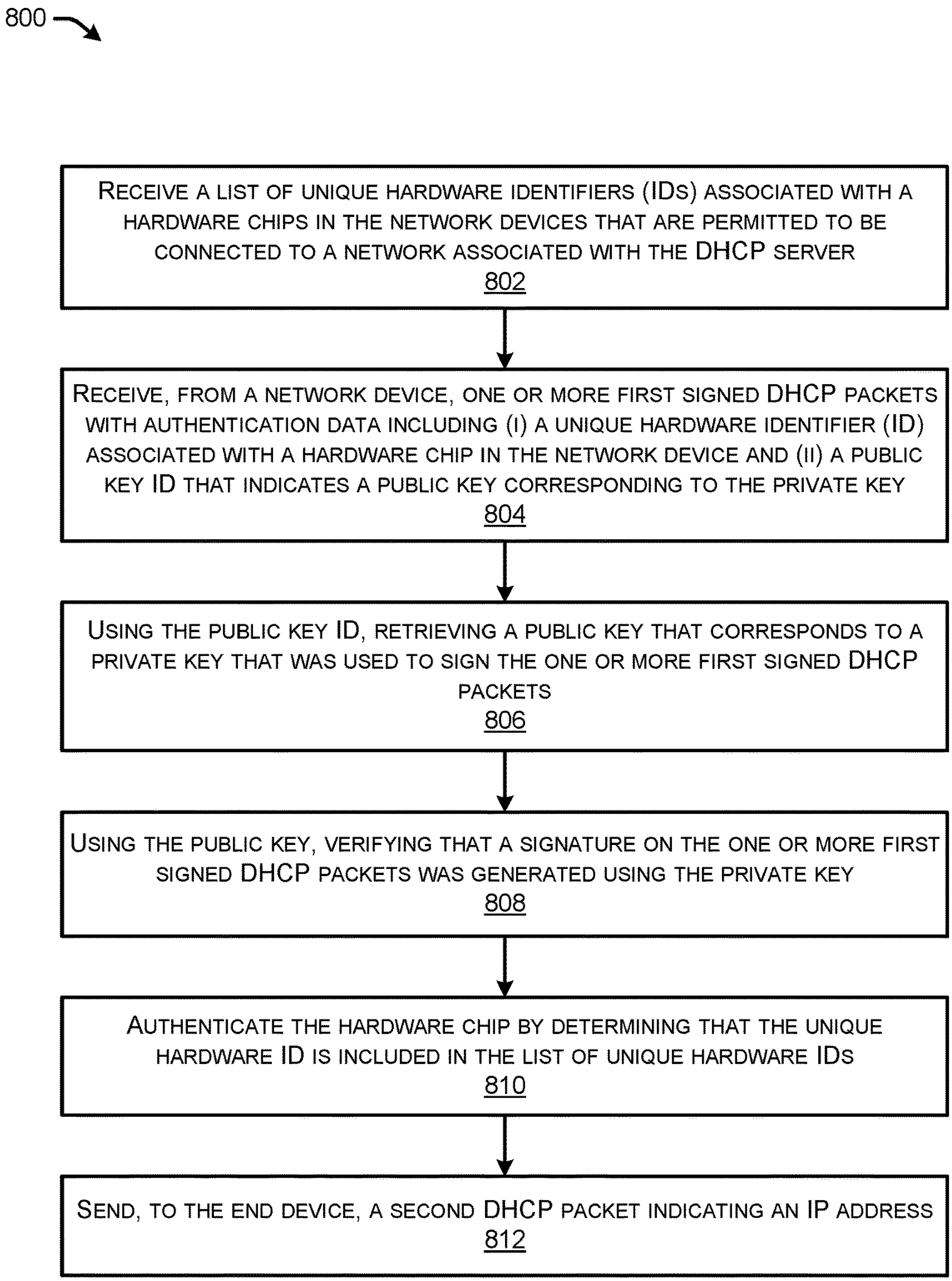

SECURING DYNAMIC HOST CONTROL PROTOCOL

BACKGROUND

Many organizations maintain networks of managed computing resources and functionality to process, store, and communicate data for various purposes. For instance, private enterprises, cloud providers, governmental agencies, Internet service providers (ISPs), and telecommunications companies manage computing systems to exchange data and achieve their purpose and strategic goals. These computing systems often include data centers which are located across disparate geographic regions and interconnected by a communication network, or a series of communication networks. Data centers are centralized facilities designed to house computing infrastructure, including servers, storage systems, networking equipment, and other hardware essential for processing, storing, and disseminating data. The amount of computing resources provided by these data centers or data processing centers can scale by adding new computing devices to the existing interconnected computing devices (or "servers") that provide the computing resources to users of the computing networks.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 8 illustrates a flow diagram of an example method where a DHCP server uses DHCP packets sent in a DORA process to cryptographically authenticate a NIC.

DETAILED DESCRIPTION

Figure 1:
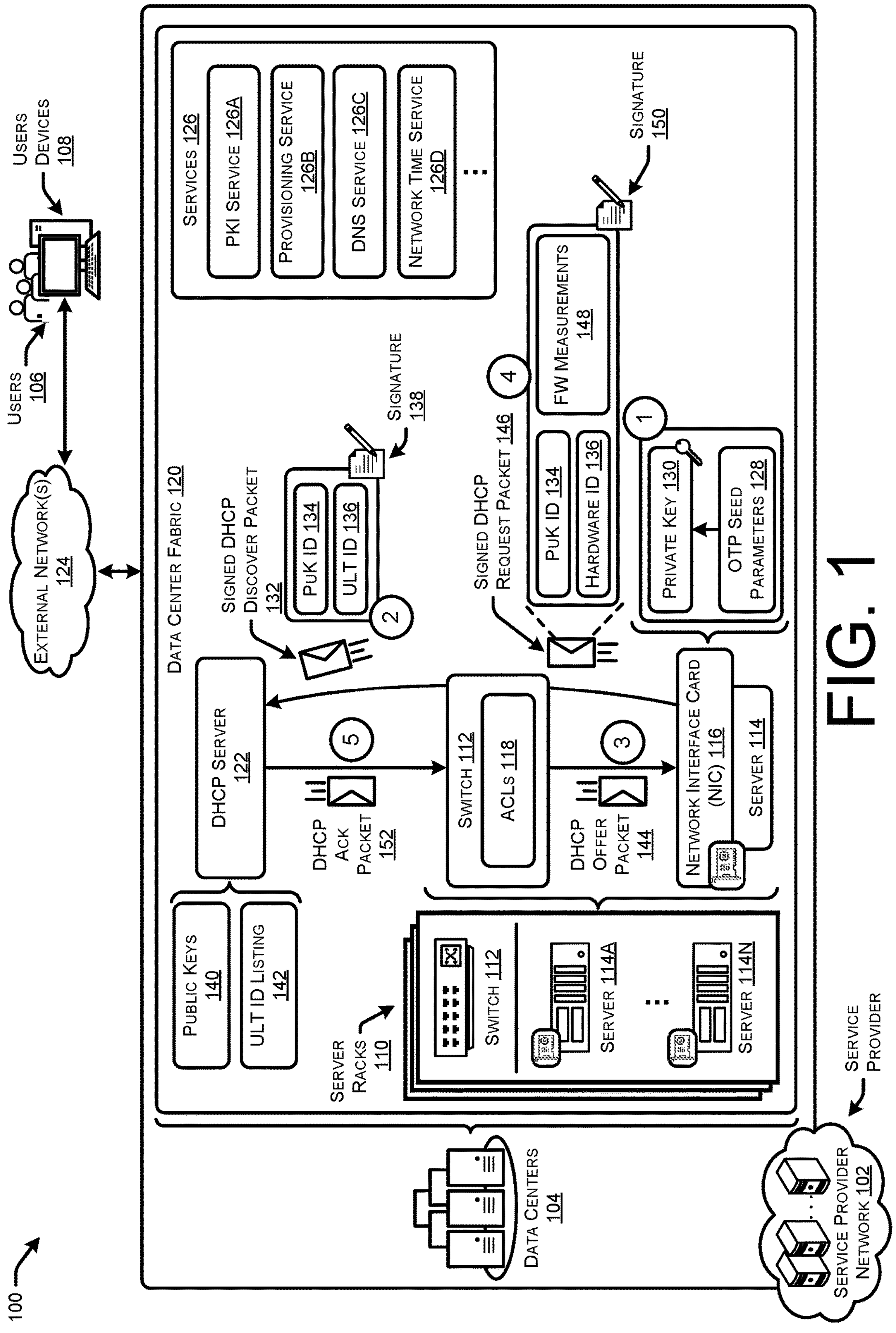
FIG. 1 illustrates a system-architecture diagram of an example environment in which a Dynamic Host Control Protocol (DHCP) server authenticates a network interface card (NIC) of a server prior to assigning an Internet Protocol (IP) address to the NIC.

This disclosure describes, at least in part, techniques for securing communications between servers and client devices to authenticate the client devices before assigning IP addresses to the client devices. In order to add a server or other computing device to a data center, a network interface card (NIC) of the server has to initially obtain an Internet Protocol (IP) address from a Dynamic Host Control Protocol (DHCP) server in the data center. Once the NIC of the server is provided with an IP address, the server is able to start communicating with services in the data center to complete its provisioning process. However, various issues surround the Discover, Offer, Request, and Acknowledge (DORA) process used in DHCP when NICs attempt to obtain IP addresses from DHCP servers.

Generally, DHCP does not have any built-in security mechanisms to authenticate a client device prior assigning an IP address to the client device. Without a mechanism to establish trust in client devices that request IP addresses from a DHCP server, various security concerns may arise, such as rogue DHCP clients or servers being installed in networks, and opening up networks to DHCP server poisoning and DHCP exhaustion attacks. This disclosure describes techniques for DHCP servers to cryptographically determine that they are assigning IP addresses to authenticated client devices.

In an illustrative embodiment, the techniques may be applied in a data center network where a server is being connected to the network using a network interface card (NIC). In this example, the NIC may have an SoC (or other chips and circuits) that stores one-time programmable (OTP) seed parameters. The NIC will use the OTP seed parameters to derive a private key that is unique to the NIC. This private key is used to sign the payloads of each DHCP packet sent as part of the Discover, Offer, Request, and Acknowledge (DORA) process to verify the authenticity of the NIC. Since the entire payload of the DHCP packets is signed, including the media access control (MAC) address and unique hardware identifier of the SoC, an attacker will not be able to spoof the DHCP packets. The DHCP server is provided with a public key that verifies signatures made using the private key of the SoC, and also a list of hardware identifiers for SoCs that are expected to be introduced into the data center network. The DHCP server can use the public key to verify the signatures on DHCP packets to authenticate the NIC, and also verify that the hardware identifier (ID) in the DHCP packets are included in the list of expected hardware IDs. Additionally, firmware code measurements can be sent in the DHCP packets to the DHCP server, and the DHCP server can authenticate the firmware of the SoCs by verifying the firmware code measurements as not being changed or tampered with as compared to when the firmware was flashed during manufacture.

Continuing the example above with respect to a NIC of a server that is introduced into a data center network, the NIC generally needs to possess, or be able to create, a cryptographic piece of information that it can use to prove that it is an authentic and trustworthy device in order to receive an IP address from the DHCP server. To accomplish this, the OTP seed parameters may be programmed into a NIC during the manufacturing process. For instance, the OTP seed parameters may be burned into fuses of a System-on-a-Chip (SoC), or other integrated circuit, during manufacturing such that they cannot be changed or tampered with. In some instances, the hardware ID may also be burned into the fuses of the SoC. Generally, the hardware ID is a unique identifier that is associated with a chip, such as the SoC, that is programmed into the SoC during manufacturing and can only be read or accessed by the SoC. The hardware ID may be a Unit-Level-Trace (ULT) ID, or another unique number, that represents or contains a hardware characteristic of the SoC, such as the coordinates of the SoC as cut from a silicon wafer. Accordingly, the manufacturer may burn OTP seed parameters and hardware IDs into fuses of SoCs included in NICs, and track that information for each NIC.

When a manufacturer ships NICs to a customers, such as an on-premises network operator or a cloud network operator, the manufacture may also provide a list of expected hardware IDs for the NICs that were manufactured, as well as public keys that correspond to private keys that are unique to the SoCs. The DHCP servers in the data center networks in which the NICs are to be deployed may be provided with the list of expected hardware IDs as well as the public keys.

Once a NIC is introduced into a data center network, such as being plugged inserted to a server and connected to a switch, the NIC may determine to send out DHCP packets in order to obtain an IP address from the DHCP server. According to the techniques described herein, however, prior to sending out a DHCP Discover packet, the NIC may perform techniques to cryptographically authenticate itself to the DHCP server. For instance, when the SoC is booted up, a Boot Read-Only Memory (Boot ROM) of the SoC may generate a private key that matches the public key shared with the DHCP server. The private key may be generated in trusted firmware, such as a Trusted Execution Environment (TEE), by the Boot ROM and as part of a measured boot process of the Boot ROM. The private key may be derived by the Boot ROM using at least the OTP seed parameters burned into the fuses.

After the private key is generated, a DHCP client running on the NIC may generate a DHCP Discover packet and populate the DHCP Discover packet with various authentication information. For instance, the DHCP Discover packet may be populated with at least a MAC address of the NIC, the hardware ID of the SoC, a public key identifier (PuK ID) that is usable by the DHCP server to identify the appropriate public key, and a message digest. The DHCP client may request that the SoC sign the DHCP Discover packet using the private key to result in a signed DHCP Discover packet. The DHCP client of the NIC may then send the signed DHCP Discover packet to the DHCP server to start the DORA process for obtaining an IP address.

Upon receiving the signed DHCP Discover packet, the DHCP server may use the PuK ID to identify and retrieve the appropriate public key, and verify the signature on the signed DHCP Discover packet. For instance, the signature may generally include or be a mathematical value generated using the private key, and the public key may apply the same cryptographic algorithm used to generate the signature in order to validate the signature. If the signature is not valid, the DHCP server may refrain from proceeding along the DORA process and prevent the NIC from obtaining an IP address. However, if the DHCP server verifies the signature, the DHCP server may verify the hardware ID signed in the DHCP Discover packet. For instance, the DHCP server may determine whether the hardware ID is included in the list of expected hardware IDs that were provided by the manufacturer. The DHCP server may determine that the hardware ID is valid, and authenticate at least the hardware of the NIC (e.g., the fuses of the SoC were burned by the manufacturer and are trustworthy).

Upon authenticating the hardware of the NIC, the DHCP server may send the NIC a DHCP Offer packet that includes at least the IP address that the DHCP server is offering to lease to the NIC. The DHCP client running on the NIC may then generate a DHCP Request packet, and populate the Request packet with some or all of the same authentication information included in the Discover packet (e.g., hardware ID, MAC address, PuK ID, etc.). In some examples, the DHCP client may further populate the DHCP Request packet with firmware code measurements or metrics of the SoC. For example, during the boot process, the Boot ROM may measure the firmware code and generate firmware code measurements that represent the firmware code as flashed by the manufacturer (e.g., code coverage, lines of code, memory usage, etc.). The DHCP client may request that the SoC sign the DHCP Request packet using the private key to result in a signed DHCP Request packet. The DHCP client may then send the signed DHCP Request packet to the DHCP server to continue the DORA process for obtaining an IP address.

Similar to the techniques described above, the DHCP server may again verify the signature on the DHCP Request packet to determine that the packet and its content was signed using the private key as expected. Further, the DHCP may again verify the signed hardware ID against the list of hardware IDs. In examples where the firmware code measurements are sent in the DHCP Request packet, the DHCP server may validate those firmware code measurements as being appropriate or expected. For instance, a publishing service of the data center network, such as an orchestrator service or services, may publish expected firmware code measurements as measured during manufacturing, and the DHCP server may store those measurements. The DHCP server may compare the firmware code measurements sent in the signed DHCP Request packet with the expected firmware code measurements to determine whether the firmware code on the NIC/SoC has been tampered with, or if the firmware code is as expected. In instances where the DHCP server determines that the firmware code has not been tampered with, the DHCP server may assign or lease the IP address to the NIC. The DHCP server may then send a DHCP Acknowledgement packet to the NIC that confirms that the DHCP server has accepted the NIC's request and has granted a lease for the IP address. However, if the firmware code has been tampered with on the NIC, the DHCP server may refrain from providing the NIC with the IP address as the NIC was unable to prove that it is a trustworthy device and untampered with.

Although some of the techniques described herein are with reference to a NIC obtaining an IP address in a data center network, the techniques are generally applicable for any type of client device that is requesting an IP address from a DHCP server. Further, while the techniques are with respect to IP addresses and DHCP servers, the techniques could be applied with other services, such as Domain Name Services (DNS) servers. Even further, the techniques may be applicable to a client device and DHCP server located in a same network, such as a Local Area Network (LAN), the techniques are equally applicable for cross-domain or cross-network communications to obtain IP addresses (or other network configurations).

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a DHCP server authenticates a NIC of a server prior to assigning an IP address to the NIC.

In some instances, the techniques may be performed by or in a service provider network 102 that is operated and/or managed by a service provider may provide various services to users to fulfil their computing resource needs, such as cloud-based computing resources. For example, the service provider network 102 may include networks of data centers 104 that provide cloud-based, scalable, and network accessible compute power services, storage services, database services, and/or other services. Users 106 may subscribe for use of the computing resources and/or services provided by the service provider network 102. The service provider network 102 may include, manage, own, or otherwise be associated with a computing-resource network that is comprises of a network of data centers 104. However, the techniques are applicable in any type of networks and not limited to service provider networks 102 or data centers 104. For instance, the techniques may be applied in enterprise networks, access networks, wide area networks (WANs), LANs, and/or any type of network managed by any type of network provider.

The service provider network 102 may span across different geographic regions, and include or be associated with server racks 110 storing switches 112 and clusters of managed computing devices, such as servers 114, stored in data centers 104 located across the different geographic regions. In this way, users 106 who have subscribed for use of the network-based services supported by computing resources in the data centers 104 need not invest in and maintain the computing infrastructure required to implement the various services that they may need. In some examples, users 106 of the service provider network 102 may access or utilize computing resources of the servers 114 (and/or any computing device) in the data centers 104 located in different geographic regions such that users located in these different geographic regions are provided with access these resources and services.

The switches 112 described herein may be any type of switch, such as modular switches, fixed-configuration switches, unmanaged switches, managed switches, smart switches, ToR switches, stackable switches, standalone switches, Layer 2 (L2) switches, and/or Layer 3 (L3) switches. The switches 112 generally connect devices within a network, such as the data center fabric 120 (or "data center network") or other LANs. The switches 112 may perform various functions, such as packet forwarding based on MAC addresses found in the Ethernet frame headers, maintain MAC address tables for efficient routing, and create separate collision domains to minimize network congestion, filtering unnecessary traffic and supporting virtual LANs for network segmentation, optimizing network performance and security. Additionally, the switches 112 may be configured to apply network policies to devices communicating on ports of the switches, such as QoS policies to prioritize critical traffic and ACLs 118, and also using a Spanning Tree Protocol (STP) to prevent network loops and ensures stability.

The ports on a switch generally refer to the physical connectors on the switch 112 where network cables can be plugged in to connect end devices such as computers, servers, routers, or other switches. Each port on the switch 112 may correspond to a specific network interface and represent a point of connection for a network device (e.g., NIC 116 of a server 114). The ports on the switch 112 may adhere to Ethernet standards and may support various speeds (e.g., 10/100/1000 Mbps or Gigabit Ethernet) and connector types (e.g., RJ-45 Ethernet ports or SFP/SFP+ ports for fiber optic connections). The ports allow devices to communicate with each other within the data center fabric 120 or other LAN, and enable the switch 112 to forward data packets between connected devices based on their MAC addresses.

Generally, the servers 114 may be located in server racks 110 in the data centers 104 and may provide various types of computing resources, such as compute (CPU) resources (e.g., central processing units (CPUs) for processing data), memory resources (e.g., physical devices capable of storing information such as RAM or ROM), storage resources (e.g., disk storage or drive storage used to store data by various electronic, magnetic, optical, or mechanical changes to a surface layer of one or more rotating disks), graphics compute (GPU) resources (e.g., graphics processing units (GPUs)), and/or network throughput resources (e.g., average or measured rate of bit transmission per second over networks). The servers 114 may be various types of computing devices, such as devices that have different chip set generations, are from different vendors, have different hardware architectures, and so forth.

In some instances, the servers 114 may have one or more NICs 116 installed thereon. The NICs 116, which may also be referred to as network adapters or network interface controllers, are hardware components that allow the server 114 (or other end devices) to connect to a port of the switch 112. The NICs 116 may be installed inside a server 114 and provide the physical connection between the server 114 and the switch 112. The NICs 116 may be expansion cards that are inserted into expansion slots on motherboards, integrated network interfaces built directly into the motherboards, or external adapters that connect via USB or other interfaces. The NICs 116 may include one or more network ports (e.g., Ethernet ports or Wi-Fi antennas) and may support different data transfer rates and network standards depending on the specific requirements of the data center fabric 120.

The servers 114 and other computing resources of the data center fabric 120 can include, for example, any hardware computing device resources, such as processor computing power/capacity, read-only and/or random-access memory, data storage and retrieval systems, device interfaces such as network or peripheral device connections and ports, and the like. In some embodiments, these resources may be dispersed among multiple discrete hardware computing devices (e.g., servers 114), and these hardware servers 114 may implement or communicate with a virtualization layer and corresponding virtualization systems (e.g., a hypervisor on a server), whereby the compute resources are represented by, and made accessible as, virtual computing resources, such as instances of virtual machine or "VM instances." A virtual computing resource may be a logical construct, such as a data volume, data structure, file system, and the like, which corresponds to certain compute resources. Non-limiting examples of virtual computing resources include virtual machines and containers (as described below), logical data storage volumes capable of storing files and other data, software programs, data processing services, and the like.

As illustrated, a server 114 may be introduced to the data center fabric 120 (or "data center network") and connect to the network itself using a NIC 116. In this example, the NIC 116 may have an SoC (or other chips and circuits) that store one-time programmable (OTP) seed parameters. At step "1," the NIC 116 will use the OTP seed parameters 128 to derive a private key 130 that is unique to the NIC 116. This private key 130 is used to sign the payloads of each DHCP packet sent as part of the DORA process to verify the authenticity of the NIC 116. Since the entire payload of the DHCP packets are signed, including the MAC address and hardware ID 136 of the SoC, an attacker will not be able to spoof the DHCP packets. The DHCP server 122 is provided with a public key 140 that verifies signatures made using the private key 130 of the SoC, and also a list of hardware ID 136 for SoCs that are expected to be introduced into the data center fabric 120. The DHCP server 122 can use the public key 140 to verify the signatures on DHCP packets to authenticate the NIC 116, and also verify that the hardware ID 136 in the DHCP packets are included in the list of expected hardware IDs 136. Additionally, firmware code measurements can be sent in the DHCP packets to the DHCP server 122, and the DHCP server 122 can authenticate the firmware of the SoCs by verifying the firmware code measurements as not being changed or tampered with as compared to when the firmware was flashed during manufacture.

Continuing the example above with respect to a NIC 116 of a server 114 that is introduced into the data center fabric 120, the NIC 116 generally needs to possess, or be able to create, a cryptographic piece of information that it can use to prove that it is an authentic and trustworthy device in order to receive an IP address from the DHCP server 122. To accomplish this, the OTP seed parameters 128 may be programmed into a NIC 116 during the manufacturing process. For instance, the OTP seed parameters 128 may be burned into fuses of a SoC, or other integrated circuit, during manufacturing such that they cannot be changed or tampered with. In some instances, the hardware ID 136 may also be burned into the fuses of the SoC. Generally, a hardware ID 136 is a unique identifier that is associated with a chip, such as the SoC, that is programmed into the SoC during manufacturing and can only be read or accessed by the SoC. The hardware ID 136 may be a unique number that represents or contains a hardware characteristic of the SoC, such as the coordinates of the SoC in a silicon wafer. Accordingly, the manufacturer may burn OTP seed parameters 128 and hardware IDs 136 into fuses of SoCs included in NICs 116, and track that information for each NIC 116.

When a manufacturer ships NICs 116 to a customers, such as an on-premises network operator or a cloud network operator (or other service provider network 102), the manufacture may also provide a list of expected hardware IDs, or a hardware ID listing 142, for the NICs 116 that were manufactured, as well as public keys 140 that correspond to private keys 130 that are unique to the SoCs. The DHCP servers 122 in the data center fabrics 120 in which the NICs 116 are to be deployed may be provided with the list of expected hardware IDs 136 as well as the public keys 140.

Once a NIC 116 is introduced into a data center fabric 120, such as being plugged inserted to the server 114 and connected to a switch, the NIC 116 may determine to send out DHCP packets in order to obtain the IP address from the DHCP server 122. According to the techniques described herein, however, prior to sending out a DHCP Discover packet 132, the NIC 116 may perform techniques to prepare to cryptographically authenticate itself to the DHCP server 122. For instance, when the SoC is booted up, a Boot ROM of the SoC may generate a private key 130 that matches the public key 140 shared with the DHCP server 122. The private key 130 may be generated in trusted firmware, such as a TEE, by the Boot ROM and as part of a measured boot process of the Boot ROM. The private key 130 may be derived by the Boot ROM using at least the OTP seed parameters 128 burned into the fuses, and potentially also a hardware identity key (HIK) that is securely embedded into the hardware of the SoC as well.

After the private key 130 is generated, a DHCP client running on the NIC 116 may generate a DHCP Discover packet 132 and populate the DHCP Discover packet 132 with various authentication information. For instance, the DHCP Discover packet 132 may be populated with at least a MAC address of the NIC, the hardware ID 136 of the SoC, a public key 140 identifier (PuK ID 134) that is usable by the DHCP server 122 to identify the appropriate public key 140, and a message digest. The DHCP client may request that the SoC sign the DHCP Discover packet 132 using the private key 130 to result in a signed DHCP Discover packet 132. The DHCP client of the NIC 116 may, at step "2," then send the signed DHCP Discover packet 132 to the DHCP server 122 to start the DORA process for obtaining an IP address.

Upon receiving the signed DHCP Discover packet 132, the DHCP server 122 may use the PuK ID 134 to identify and retrieve the appropriate public key 140, and verify the signature on the signed DHCP Discover packet 132. For instance, the signature may generally include or be a mathematical value generated using the private key 130, and the public key 140 may apply the same cryptographic algorithm used to generate the signature in order to validate the signature. If the signature is not valid, the DHCP server 122 may refrain from proceeding along the DORA process and prevent the NIC 116 from obtaining an IP address. However, if the DHCP server 122 verifies the signature, the DHCP server 122 may verify the hardware ID 136 signed in the DHCP Discover packet 132. For instance, the DHCP server 122 may determine whether the hardware ID 136 is included in the hardware ID listing 136 that was provided by the manufacturer. The DHCP server 122 may determine that the hardware ID 136 is valid, and authenticate at least the hardware of the NIC 116 (e.g., the fuses of the SoC were burned by the manufacturer and are trustworthy).

Upon authenticating the hardware of the NIC 116, the DHCP server 122 may send, at step "3," the NIC a DHCP Offer packet 144 that includes at least the IP address that the DHCP server 122 is offering to lease to the NIC. The DHCP client on the NIC 116 may then generate a DHCP Request packet 146, and populate the DHCP Request packet 146 with some or all of the same authentication information included in the Discover packet 132 (e.g., hardware ID 136, MAC address, PuK ID 134, etc.). In some examples, the DHCP client may further populate the DHCP Request packet 146 with firmware code measurements 148 (or "FW measurements 148") or metrics of the SoC. For example, during the boot process, the Boot ROM may measure the firmware code and generate firmware code measurements 148 that represent the firmware code as flashed by the manufacturer (e.g., code coverage, lines of code, memory usage, etc.). The DHCP client may request that the SoC sign the DHCP Request packet 146 using the private key 130 to result in a signed DHCP Request packet 146. The DHCP client may then send, at step "4," the signed DHCP Request packet 146 to the DHCP server 122 to continue the DORA process for obtaining an IP address.

Similar to the techniques described above, the DHCP server 122 may again verify the signature on the DHCP Request packet 146 to determine that the packet and its content was signed using the private key 130 as expected. Further, the DHCP may again verify the signed hardware ID 136 against the hardware ID listing 136. In examples where the FW measurements 148 are sent in the DHCP Request packet 146, the DHCP server 122 may validate those firmware measurements 148 as being appropriate or expected. For instance, a publishing service of the data center network, such as an orchestrator service or services, may publish expected firmware code measurements as measured during manufacturing, and the DHCP server 122 may store those expected firmware measurements. The DHCP server 122 may compare the firmware measurements 148 sent in the signed DHCP Request packet 146 with the expected firmware code measurements to determine whether the firmware code on the NIC/SoC has been tampered with, or if the firmware code is as expected. In instances where the DHCP server 122 determines that the firmware code has not been tampered with, the DHCP server 122 may assign or lease the IP address to the NIC. The DHCP server 122 may then send a DHCP Acknowledgement packet to the NIC that confirms that the DHCP server 122 has accepted the NIC's request and has granted a lease for the IP address. However, if the firmware code has been tampered with on the NIC 116, the DHCP server 122 may refrain from providing the NIC with the IP address as the NIC 116 was unable to prove that it is a trustworthy device and untampered with.

In some instances, the data center fabric 120 may include or be associated with one or more services 126, such as a PKI service 126A, a provisioning service 126B, a DHCP server 122 running a DHCP service, a DNS service 126C, network time service 126D, and/or other services. In such examples, the DHCP Acknowledgement packet may include service IP addresses for each of those trusted services and servers. The NIC 116 and/or server 114 may extract those service IP addresses and use them to contact the appropriate services as the server 114 operates (e.g., sending DNS requests, requesting provisioning from the provisioning service 126B, etc.).

Users 106 may create user accounts with the service provider to utilize the resources and services of the service provider network 102. The users 106 may utilize their user devices 108 to communicate over the external network(s) 124 (e.g., WANs, PANs, LANs, etc.) with the service provider network 102. The user devices 108 may comprise any type of computing device configured to communicate over the external network(s) 124, such as mobile phones, tablets, laptop computers, desktop computers, televisions, servers, and/or any other type of computing device. The users 106 may desire that the service provider network 102 host or support workloads in the data centers 104 that are managed by the service provider. Accordingly, the users 106 may, via their user account, request that a workload be launched on their behalf, and provide input data via one or more user portals (e.g., web console, command line interface (CLI), application programming interface (API), etc.). As described herein, a workload may generally include a designated collection or grouping of computing resources (e.g., compute, memory, storage, networking, etc.) in a computing-resource network, and the code or logic that performs functionality using the computing resources. The service provider network 102 may support a wide variety of workloads, such as web servers, databases, customer-facing applications, distributed data stores, batch processing, machine/deep learning training and/or inference, online gaming, video encoding, memory caching, and/or any other type of workload that can be supported by computing resources of a computing-resource network.

Generally, the service provider network 102, and components thereof, may comprise software, firmware, and/or other logic that is supported one computing device, or across more computing devices in the service provider network 102. Additionally, the service provider network 102 may comprise a system of other devices, such as software agents stored locally on virtual resources.

Figure 2:
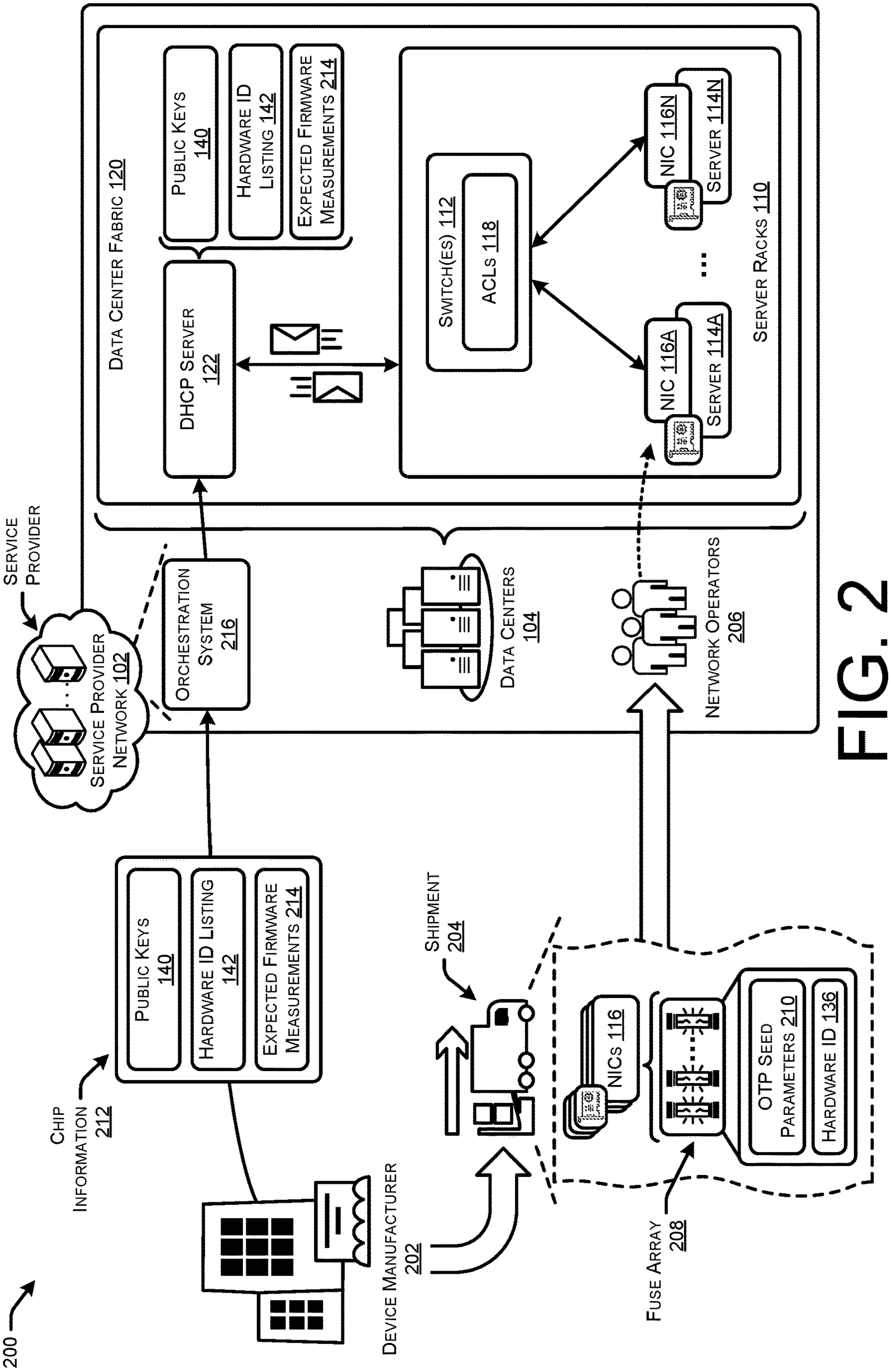
FIG. 2 illustrates an example environment in which a device manufacturer stores identity information in fuse arrays of SoCs in the NICs, and sends chip information to a service provider that is used by a DHCP server to authenticate the NICs.

FIG. 2 illustrates an example environment 200 in which a device manufacturer 202 (e.g., original equipment manufacturer (OEM)) stores identity information in fuse arrays of devices, such as SoCs in the NICs 116, and sends chip information to a service provider that is used by a DHCP server 122 to authenticate the NICs 116. Although the techniques of this disclosure are with reference to NICs 116 and SoCs, the techniques are applicable for any client device that interacts with a DHCP server 122 and any type of chip, including but not limited to Application-Specific Integrated Circuits (ASICs), Field-Programmable Gate Arrays (FPGAs), Network Processor, Graphics Processing Units (GPUs), Central Processing Units (CPUs), and so forth.

During the manufacturing process, the device manufacturer 202 may program OTP seed parameters 210 into the NICs 116. For instance, the OTP seed parameters 210 may be burned into a fuse array 208 of the SoC, or other integrated circuit, during manufacturing such that they cannot be changed or tampered with. In some instances, the hardware IDs 136 may also be burned into the fuse arrays 208 of the SoCs. However, other storage mechanisms may be used to store the OTP seed parameters 210 and/or hardware IDs 136. The device manufacturer 202 may send a shipment 204 of NICs 116 to network operators to be used to connect client devices, such as servers 114, to the data center fabrics 120 of the service provider network 102.

When the device manufacturer 202 ships the NICs 116 to customers in shipments 204, the device manufacture 202 may also provide chip information 212 to the network operators 206, and/or directly to an orchestration system 216 of the service provider network 102. The chip information 212 may include, for example, the public keys 140 that correspond to the derived private keys 130 of the SoCs, the hardware ID listing 142 for at least the NICs 116 in the shipment 204, and expected firmware measurements 214 for firmware code of the SoC. The expected firmware measurements 214 may represent various metrics for the firmware code as flashed into the SoC of the NIC 116 by the device manufacturer 202 during the manufacturing process, such as code coverage, lines of code, memory usage, etc. Changes between the firmware measurements on the NICs 116 and the expected firmware measurements 214 may indicate tampering or disallowed chances to the firmware of the NIC 116. The orchestration system 216 may securely receive the chip information 212 (e.g., encryption protocols), and may securely send the chip information 212 to the DHCP server 122.

Figure 3A:
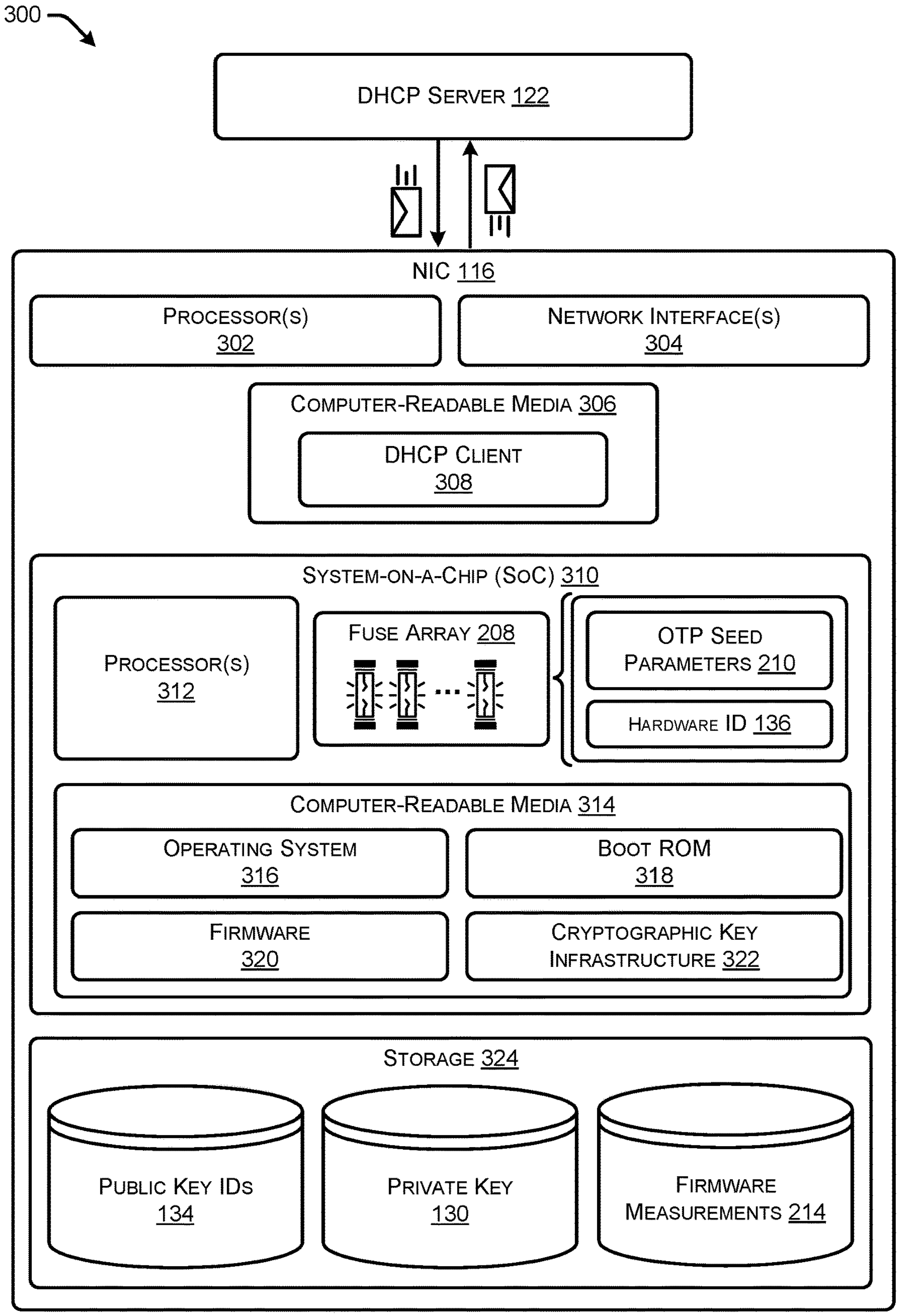
FIG. 3A illustrates a component diagram of a NIC configured to perform techniques described herein.

FIG. 3A illustrates a component diagram of a NIC 116 configured to perform techniques described herein. As illustrated, the NIC 116 may include one or more hardware processors 302 (processors), or one or more devices, configured to execute one or more stored instructions. The processor(s) 302 may comprise one or more cores and may be responsible for executing instructions and processing data to perform various tasks. The processor(s) 302 may comprise arithmetic logic units, control units, and registers, enabling it to carry out complex operations swiftly and efficiently. Further, the NIC 116 may include one or more network interfaces 304 configured to provide communications between the NIC 116 and other devices, such as the servers 114 and the DHCP server 122, and/or other systems or devices in the service provider network 102 and/or remote from the service provider network 102. The network interfaces 304 may include devices configured to couple to personal area networks (PANs), wired and wireless local area networks (LANs), wired and wireless wide area networks (WANs), and so forth. The network interfaces 304 may include hardware components, such as Ethernet ports, wireless transceivers, or modem interfaces, and software protocols that manage data transmission. The network interfaces 304 can support various communication standards, including Ethernet, Wi-Fi, Bluetooth, and cellular technologies, allowing for versatile connectivity options. Advanced network interfaces may incorporate features like Quality of Service (QoS) prioritization, security protocols, and energy-efficient operation.

As shown, the NIC 116 may include computer-readable media 306 that stores and executes a DHCP client 308. The DHCP client 308 may be a software component configured to perform operations to obtain network configuration parameters from a DHCP server 122. These parameters typically include an IP address, subnet mask, default gateway, DNS server addresses, and lease duration. The DHCP client 308 sends a DHCP discover message to discover DHCP servers 122 on the data center fabric 120, receives DHCP offer messages from available DHCP servers 122, selects one offer, and sends a DHCP request to request the offered configuration. Upon receiving a DHCP acknowledgment from the selected server, the DHCP client 308 configures its network interface 304 with the assigned parameters and joins the network. In some instances, however, the DHCP client 308 may be configured to work in conjunction with an SoC 310 to sign the DHCP packets sent and received.

The NIC 116 may include the SoC 310 is an integrated circuit (IC) that incorporates most or all of the components of a typical computer or electronic system onto a single chip. These components typically include a central processing unit (CPU) (e.g., processor(s) 312), computer-readable media 314 such as memory, input/output interfaces, and various peripherals. The NIC may include the fuse array 208 in which is burned OTP seed parameters 210 and a hardware ID 136 for the SoC. The computer-readable media 314 may include an operating system 316 to manage components of the SoC 310, and Boot ROM 318, which may be firmware, and is a small program stored in a non-volatile memory chip within the SoC 310 and initializes the hardware components of the SoC 310 and start the boot process when the device is powered on or reset. For instance, when the SoC 310 is booted up, the Boot ROM 318 of the SoC 310 may generate a private key 130 that matches the public key 140 shared with the DHCP server 122. The private key 130 may be generated in trusted firmware, such as a Trusted Execution Environment (TEE), by the Boot ROM 318 and as part of a measured boot process of the Boot ROM 318. The private key 130 may be derived by the Boot ROM 318 using at least the OTP seed parameters 210 burned into the fuse array 208, and potentially also a hardware identity key that is securely embedded into the hardware of the SoC 310 as well. The SoC 310 may further include various types of storage 324 that store the public key ID(s) 134 that correspond to their private key 130, as well as firmware measurements 214. Generally, during the boot process, the Boot ROM 318 may measure firmware code of the SoC 310 and generate firmware measurements 214 that represent the firmware code as flashed by the manufacturer (e.g., code coverage, lines of code, memory usage, etc.).

Figure 3B:
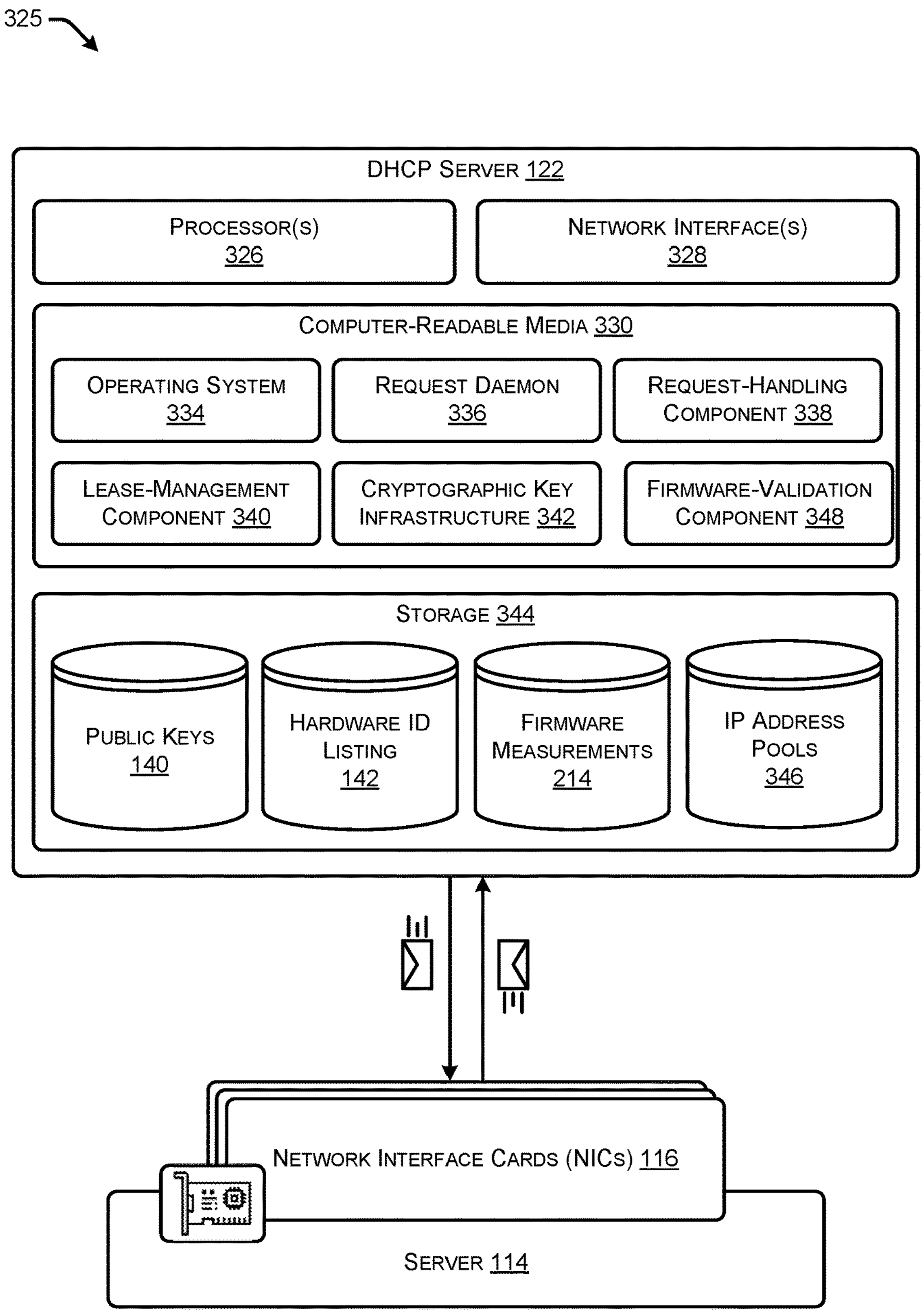
FIG. 3B illustrates a component diagram of a DHCP server configured to perform techniques described herein.

FIG. 3B illustrates a component diagram 325 of a DHCP server 122 configured to perform techniques described herein. The DHCP server 122 may include one or more processors 326 and one or more network interfaces 328. Further, the DHCP server 122 may include computer-readable media 330 that stores and executes an operating system 334, a request daemon 336, a request-handling component 338, a lease-management component 340, and a cryptographic infrastructure 342.

The request daemon 336 may be a background process or service running on the DHCP server 122 that listens for incoming DHCP client requests on a network. The main function of the request daemon 336 is to receive DHCP messages, such as DHCP discover or DHCP request packets, from clients and pass them to the request-handling component 338 for processing. The request daemon 336 ensures that the DHCP server 122 is constantly available to respond to client requests and maintains the responsiveness of the DHCP service.

The request-handling component process DHCP client requests received by the request daemon 336. Upon receiving a DHCP message, the request-handling component 338 parses the message to extract relevant information, such as the client's MAC address, requested IP address, and options included in the message (describe further in FIG. 5). Based on this information (e.g., authentication information) and upon communicating with the cryptographic key infrastructure 342, the request-handling component 338 determines whether to assign a new IP address to the NIC 116 or renew an existing lease. The request-handling component 338 constructs DHCP acknowledgment messages containing the assigned IP address and configuration options and transmits them back to the requesting NICs 116. Additionally, the request-handling component 338 handles error conditions encountered during request processing and logs DHCP request processing details. Generally, the request-handling component 338 may work in conjunction with the cryptographic key infrastructure 342 to verify signatures on the DHCP packets received from the NIC 116. The cryptographic key infrastructure 342 may perform techniques known in the art to verify signatures using public keys 140, such as using asymmetric cryptography formulas to show that the signature was signed using a private key 130 that is mathematically related to the public key 140.

The lease-management component 340 may be responsible for managing IP address leases from IP address pools 346 granted to DHCP clients, such as the NICs 116. The lease-management component 340 maintains a lease database or table (e.g., IP address pools 346) that records details of leased IP addresses, including the assigned IP address, lease duration, client identifier (MAC address), and lease expiration time. When processing DHCP client requests, the lease-management component 340 updates the lease database to reflect IP address assignmen340*ts* or lease renewals. It ensures efficient utilization of available IP addresses, prevents address conflicts, and tracks lease expiration times to reclaim and reassign IP addresses as needed.

The computer-readable media 330 may further store and execute a firmware-validation component 348. In examples where the FW measurements 148 are sent in the DHCP Request packet 146, the firmware-validation component 348 may validate those firmware measurements 148 as being appropriate or expected. For instance, a publishing service of the data center network, such as an orchestrator system 216, may publish expected firmware code measurements as measured during manufacturing, and the DHCP server 122 may store those expected firmware measurements. The firmware-validation component 348 may compare the firmware measurements 148 sent in the signed DHCP Request packet 146 with the expected firmware code measurements to determine whether the firmware code on the NIC/SoC has been tampered with, or if the firmware code is as expected. In instances where the firmware-validation component 348 determines that the firmware code has not been tampered with, the DHCP server 122 may assign or lease the IP address to the NIC. The DHCP server 122 may then send a DHCP Acknowledgement packet to the NIC that confirms that the DHCP server 122 has accepted the NIC's request and has granted a lease for the IP address. However, if the firmware code has been tampered with on the NIC 116, the DHCP server 122 may refrain from providing the NIC with the IP address as the NIC 116 was unable to prove that it is a trustworthy device and untampered with.

As described herein, the processor(s) 302, processor(s) 312, and processor(s) 326 may include one or more hardware processors (processors), or one or more devices, configured to execute one or more stored instructions. The processor(s) 302, 312, and 326 may comprise one or more cores and may be responsible for executing instructions and processing data to perform various tasks. The processor(s) 302, 312, and 326 may comprise arithmetic logic units, control units, and registers, enabling it to carry out complex operations swiftly and efficiently. Further, the network interfaces 304 and 328 configured to provide communications between the NIC 116, server 114, DHCP server 122, and other devices and/or other systems or devices in the service provider network 102 and/or remote from the service provider network 102. The network interfaces 304 and 328 may include devices configured to couple to personal area networks (PANs), wired and wireless local area networks (LANs), wired and wireless wide area networks (WANs), and so forth. The network interfaces 304 and 328 may include hardware components, such as Ethernet ports, wireless transceivers, or modem interfaces, and software protocols that manage data transmission. The network interfaces can support various communication standards, including Ethernet, Wi-Fi, Bluetooth, and cellular technologies, allowing for versatile connectivity options.

The computer-readable media 306, 314, and 330, also referred to as memory, stores various executable components (e.g., software-based components, firmware-based components, etc.). In addition to various components discussed in FIGS. 3A and 3B, the computer-readable media 306, 314, and 330 may further store components to implement functionality described herein. By way of example, and not limitation, memory may be computer-readable media 306, 314, and 330 and can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The storage described herein, such as storage 324 and 344, may comprise hard disk drives (HDDs), solid-state drives (SSDs), cache memory, and non-volatile memory (e.g., flash memory). The storage 324 and 34 may comprise various storage mediums offer varying capacities, data transfer rates, and durability characteristics. In some instances, the storage may enable the retention of user data, system configurations, and installed applications even when the devices are powered off.

Figure 4:
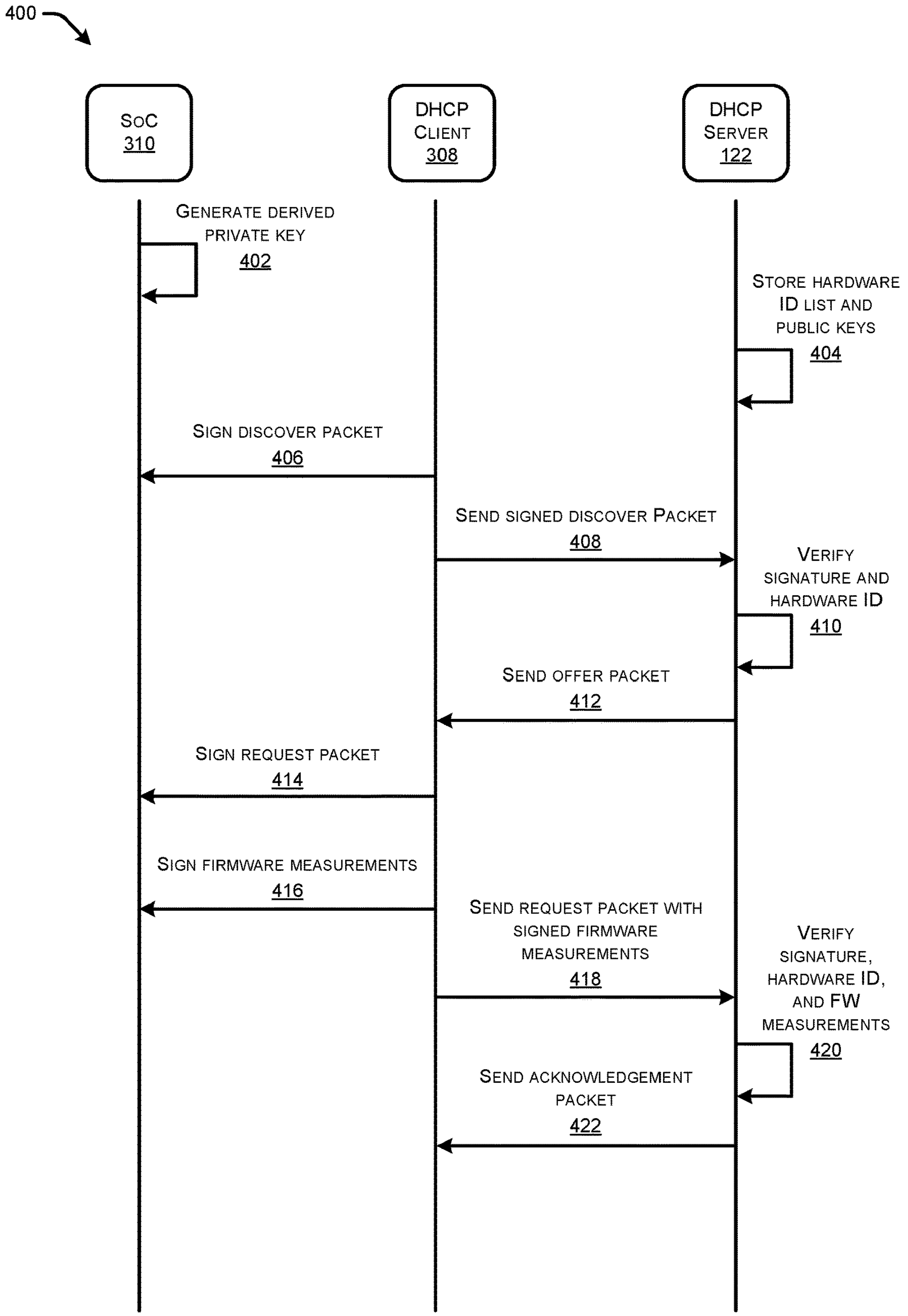
FIG. 4 illustrates a sequence diagram of an example method for a DHCP client and an SoC of a NIC to interact in order to sign DHCP packets used to authenticate the NIC to a DHCP server to be assigned an IP address.

FIG. 4 illustrates a sequence diagram of an example method 400 for a DHCP client 308 and an SoC 310 of a NIC 116 to interact in order to sign DHCP packets used to authenticate the NIC 116 to a DHCP server 122 to be assigned an IP address.

At 402, the SoC 310 may generate a derived private key. For instance, the Boot ROM 318 may perform a cryptographic process using at least the OTP seed parameters 210 with additional entropy (e.g., hardware identity key) and applies a secure key derivation algorithm to generate the private key 130. At 404, the DHCP server 122 may receive the hardware ID listing 142 and public keys 140 from the orchestration system 216, and store the information locally.

At 406, the DHCP client 308 may populate a DHCP Discover packet 132 with at least a PuK ID 134 and hardware ID 136, and have the SoC sign the DHCP Discover packet 132 with the private key 130.

At 408, the DHCP client 308 may send the signed DHCP Discover packet 132 to the DHCP server 122. At 410, the DHCP server 122 may use the PuK ID 134 in the signed DHCP Discover packet 132 to identify the appropriate public key 140, and verify the signature using the public key 140 and hardware ID listing 142.

At 412, the DHCP server 122 may send a DHCP Offer packet 144 back to the NIC 116 to indicate the IP address that is being offered. At 414, the DHCP client 308 may generate a DHCP Request packet 146 and populate the DHCP Request packet 146 with at least a PuK ID 134, hardware ID 136, and FW measurements 148. At 414, the DHCP client 308 may work with the SoC 310 to sign the DHCP Request packet 146 to generate a signed DHCP Request packet 146. Similar, at 416, the SoC 310 may sign the firmware measurements that are included in the DHCP Request packet 146.

At 418, the DHCP client 308 may send the signed DHCP Request packet 146 to the DHCP server 122. At 420, the DHCP server 122 may verify the signature, hardware ID, and FW measurements in the signed DHCP Request packet 146. In response to verifying the information, the DHCP server 122 may send, at 422, a DHCP Acknowledgement packet 152 back to the DHCP client 308 that includes the IP address.

Figure 5:
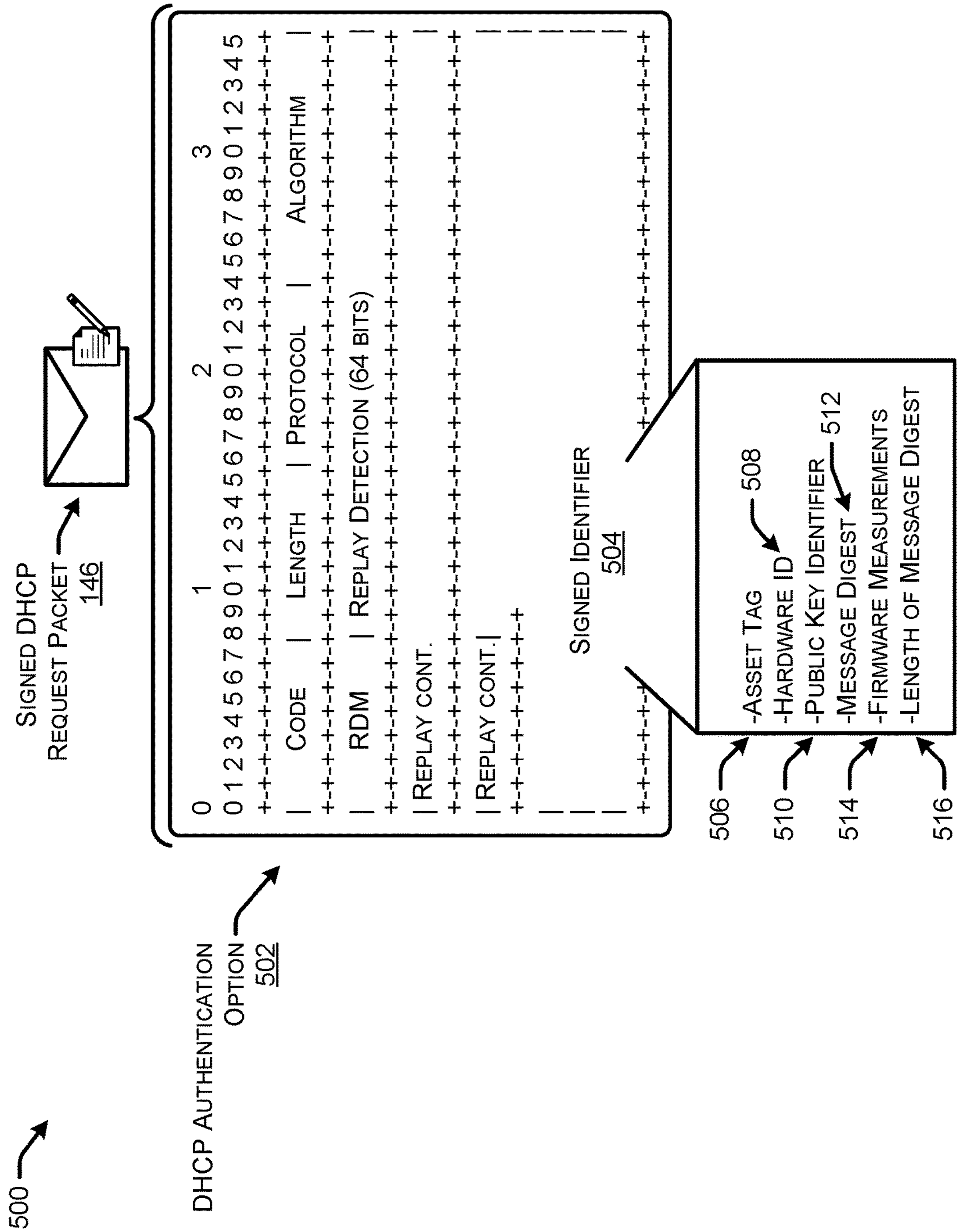
FIG. 5 illustrates an example of a DHCP authentication option of a signed DHCP request packet that includes signed authentication information that is used by a DHCP server to authenticate a NIC.

FIG. 5 illustrates an example of a DHCP authentication option 502 of a signed DHCP request packet 146 that includes signed authentication information that is used by a DHCP server to authenticate a NIC. In some instances, the DHCP authentication option 502 may be in a format of authentication option 90 as defined in Request for Comments (RFC) 3118.

As shown, a signed identifier 504 included in the DHCP authentication option 502 may include various information, such as an asset tag 506 that is a unique identifier or label associated with the SoC 310 and/or NIC 116 to track and manage it throughout its lifecycle. Further, the signed identifier 504 may include the hardware ID 508, the public key identifier 510, and a message digest 512. In some instances, the message digest 512 may be a hash of the DHCP Request packet 146 signed in trusted firmware using the private key 140. The signed identifier 504 may further include the firmware measurements 514, and an indication of the length of the message digest 516.

FIGS. 6A-6C, 7, and 8 illustrate flow diagrams of example methods 600, 700, and 800 that illustrate aspects of the functions performed at least partly by the devices or components in the service provider network 102 as described in this disclosure (e.g., NIC 116, DHCP server 122, etc.). The logical operations described herein with respect to FIGS. 6A-6C, 7, and 8 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 6A-6C, 7, and 8 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 6A:
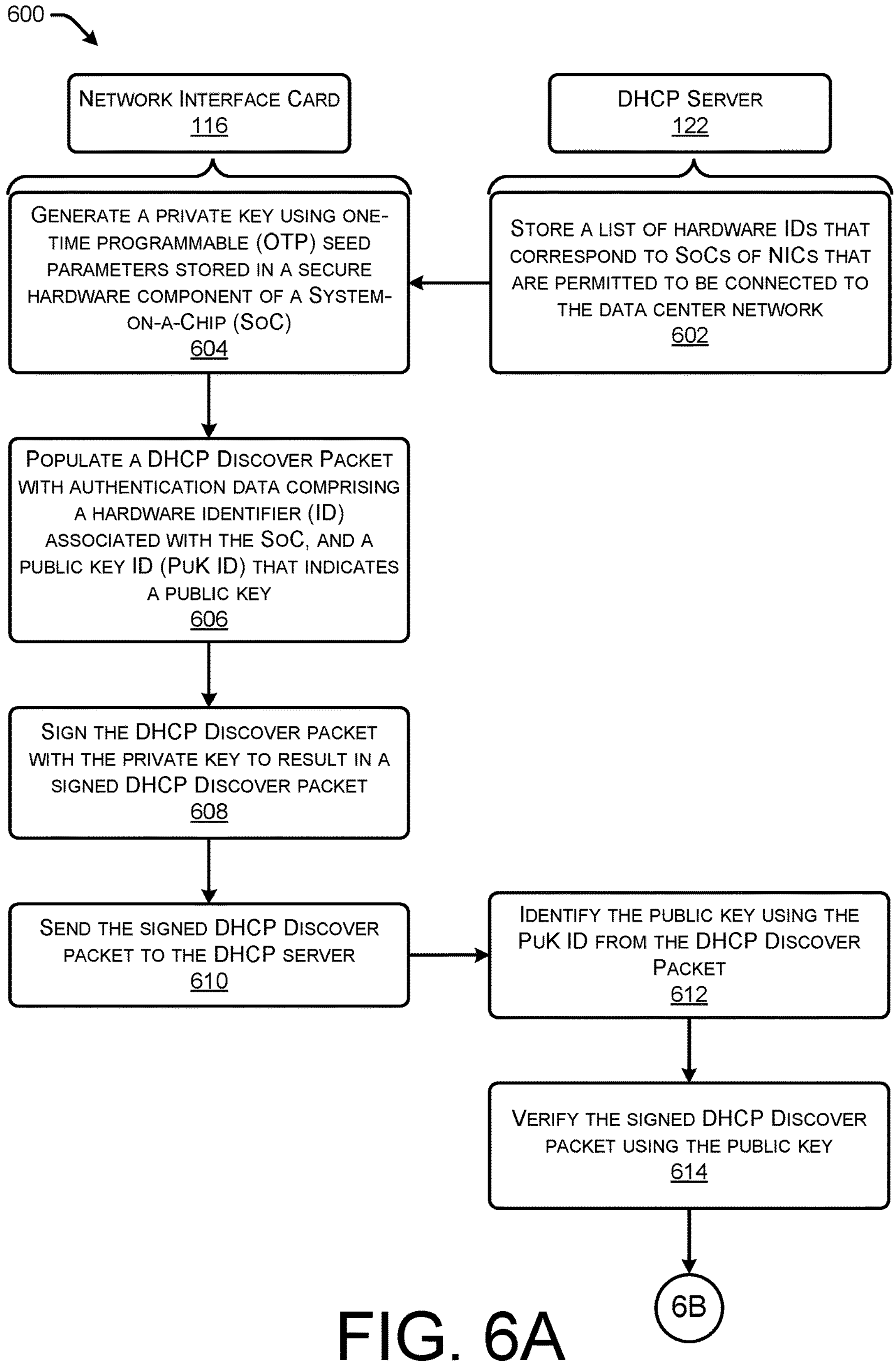
FIGS. 6A-6C collectively illustrate a flow diagram of an example method where a NIC and DHCP server use DHCP packets sent in a DORA process to cryptographically authenticate the NIC.
Figure 6B:
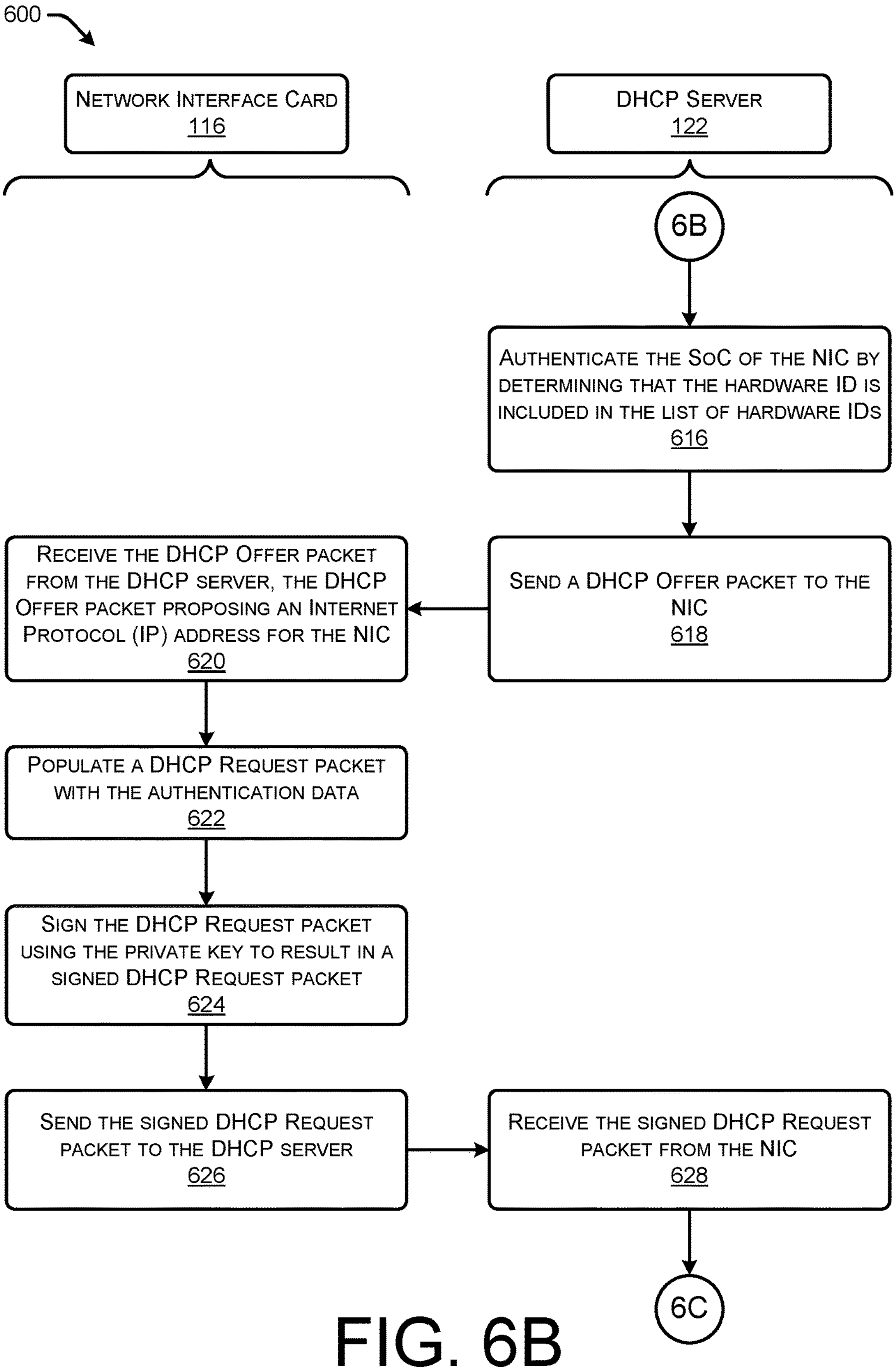
Figure 6C:
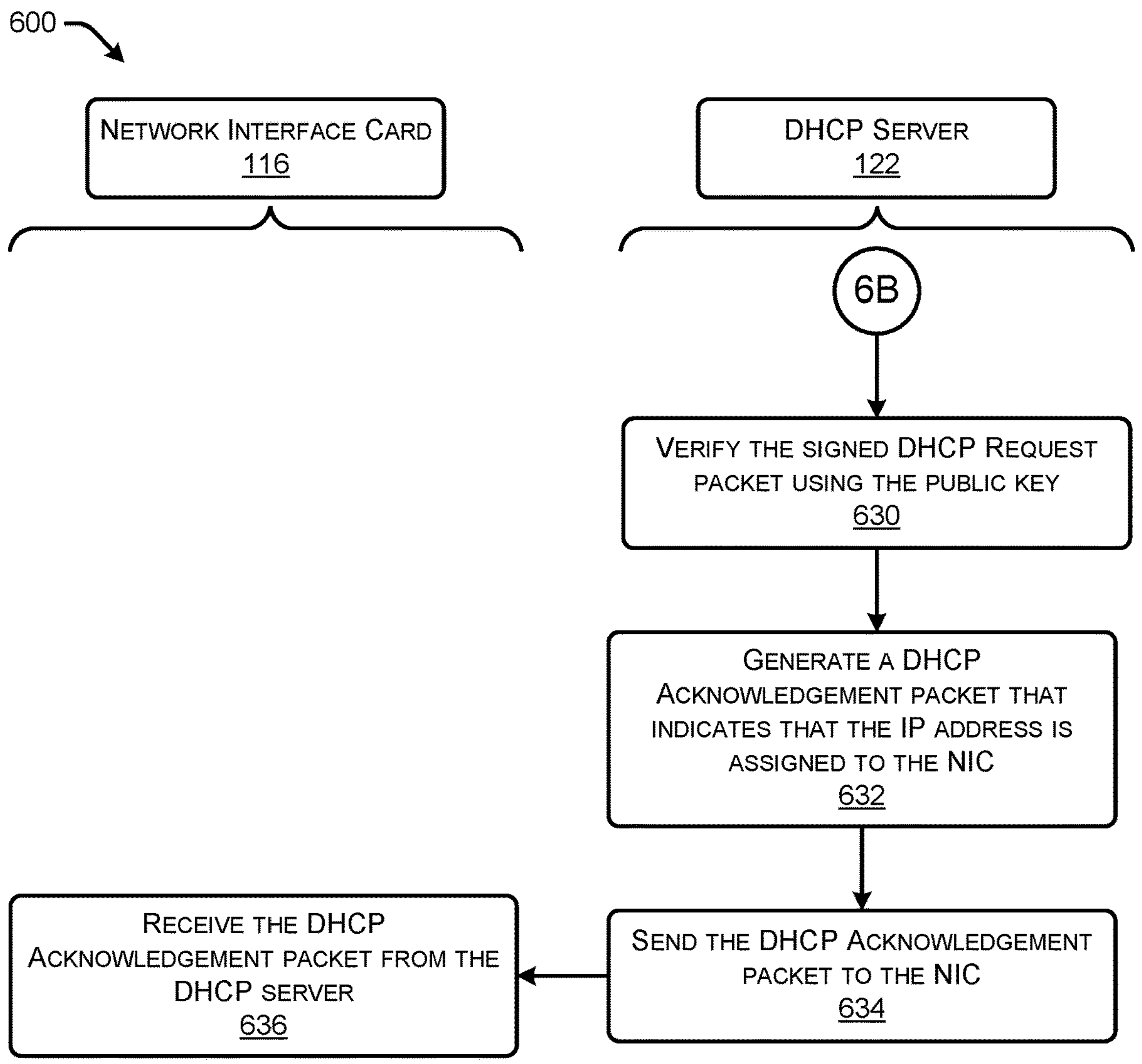

FIGS. 6A-6C collectively illustrate a flow diagram of an example method 600 where a NIC 116 and DHCP server 122 use DHCP packets sent in a DORA process to cryptographically authenticate the NIC 116. The method 600 may be performed by a system comprising a server 114, NIC connected to the server 114, and a DHCP server 122.

At 602, the DHCP server 122 may store a list of hardware IDs that correspond to SoCs of NICs that are permitted to be connected to the data center network. For instance, chip information 212 including a hardware ID listing 142 may be published by the orchestration system 216 to the DHCP server 122.

At 604, the NIC 116 may generate a private key 130 using one-time programmable (OTP) seed parameters 128 stored in a secure hardware component of a System-on-a-Chip (SoC) 310. In some examples, the OTP seed parameters 210 may be burned into a fuse array 208 of the SoC 310, or other integrated circuit, during manufacturing such that they cannot be changed or tampered with. However, other storage mechanisms may be used to store the OTP seed parameters 210.

At 606, the NIC 116 may populate a DHCP Discover Packet 132 with authentication data comprising a hardware identifier (ID) 136 associated with the SoC 310, and a public key ID (PuK ID) 134 that indicates a public key 140 corresponding to the private key 130.

At 608, the NIC 116 may sign the DHCP Discover packet 132 with the private key 130 to result in a signed DHCP Discover packet 132. At 610, the NIC 116 may send the signed DHCP Discover packet to the DHCP server 122 to start the DORA process for obtaining an IP address.

At 612, the DHCP server 122 may identify the public key using the PuK ID 134 from the DHCP Discover Packet 132. For instance, the PuK ID 134 may be used to identify the public key 140 from a list of public keys 140 stored at the DHCP server 122.

At 614, the DHCP server 122 may verify the signed DHCP Discover packet 132 using the public key 140. For instance, the signature 138 may generally include or be a mathematical value generated using the private key 130, and the public key 140 may apply the same cryptographic algorithm used to generate the signature 138 in order to validate the signature 138.

At 616, the DHCP server 122 may authenticate the SoC 310 of the NIC 116 by determining that the hardware ID 136 is included in the list of hardware IDs 142. The hardware ID listing 142 may generate comprise a list of hardware identifiers for SoCs 310 received form device manufacturers 202 that are expected to be introduced into the data center fabric 120. At 618, the DHCP server 122 may send the DHCP Offer packet to the NIC 116.

At 620, the NIC 116 may receive a DHCP Offer packet 144 from the DHCP server. Generally, the DHCP Offer packet 144 proposes IP address for the NIC 116 to use.

At 622, the NIC 116 may populate a DHCP Request packet 146 with the authentication data. For instance, the authentication data may be included in a signed identifier 504 included in a DHCP authentication option 502. The authentication data may include various information, such as an asset tag 506 that is a unique identifier or label associated with an SoC 310 and/or the NIC 116, the hardware ID 508, the public key identifier 510, and a message digest 512.

At 624, the NIC 116 may sign the DHCP Request packet 146 using the private key 130 to result in a signed DHCP Request packet 146. At 626, the NIC 116 may send the signed DHCP Request packet 146 to the DHCP server 122. At 628, the DHCP server 122 may receive the signed DHCP Request packet 146 from the NIC 116.

At 630, the DHCP server 122 may verify the signed DHCP Request packet using the public key. For instance, a signature 150 on the signed DHCP request packet 146 may generally include or be a mathematical value generated using the private key 130, and the public key 140 may apply the same cryptographic algorithm used to generate the signature 150 in order to validate the signature 150.

At 632, the DHCP server 122 may generate the DHCP Acknowledgement packet 152. The DHCP Acknowledgement packet 152 may confirm the successful allocation of network configuration parameters to the client, such as the assigned IP, a subnet mask, a gateway/router IP address, a lease duration, a DNS server IP address, and/or other information.

At 634, the DHCP server 122 may send the DHCP Acknowledgement packet 152 to the NIC 116. At 636, the NIC 116 may receive, from the DHCP server 122, a DHCP Acknowledgement packet 152 that indicates that the IP address is assigned to the NIC 116.

Figure 7:
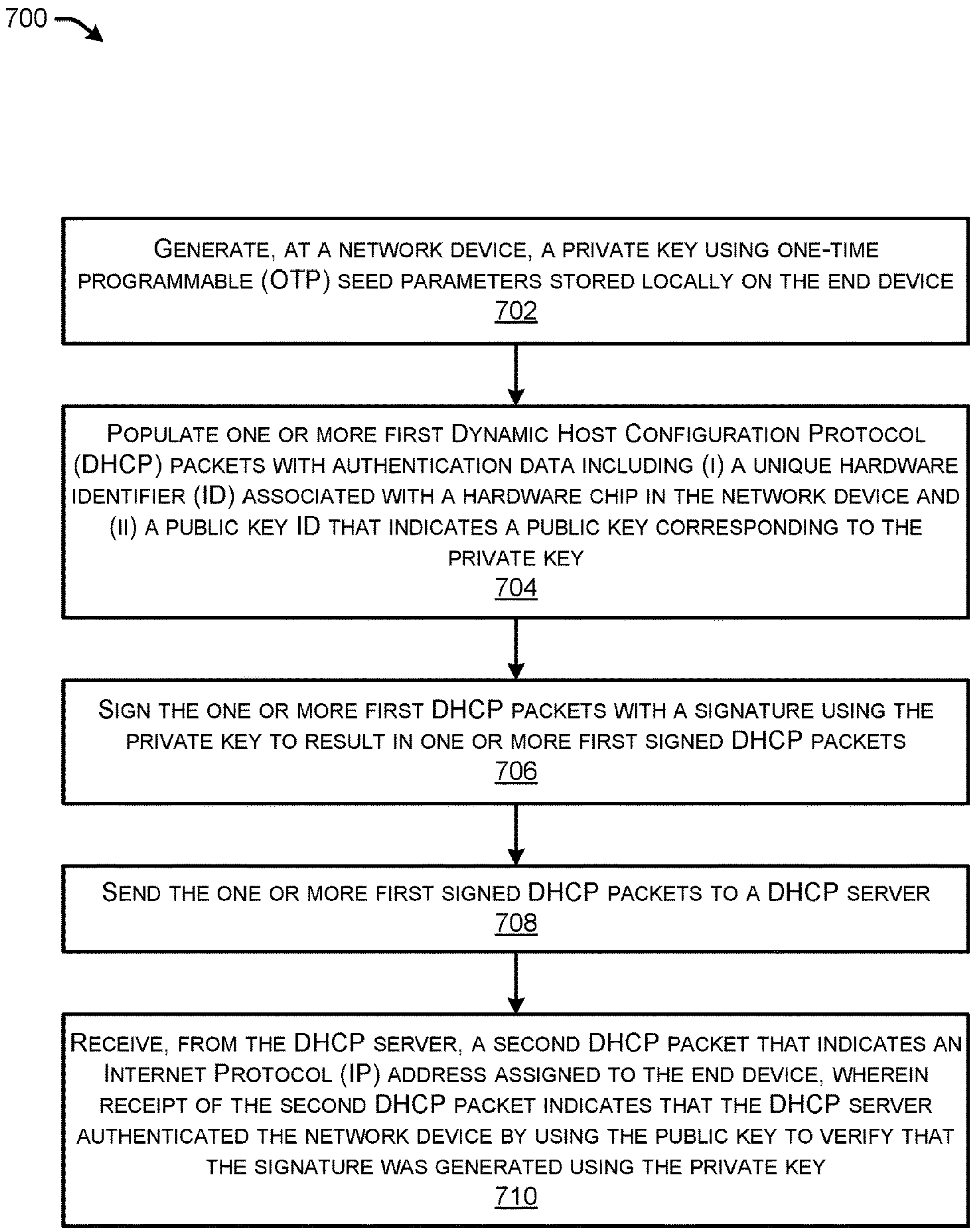
FIG. 7 illustrates a flow diagram of an example method for a NIC to cryptographically authenticate itself to a DHCP server in order to be assigned an IP address.

FIG. 7 illustrates a flow diagram of an example method for a network device (e.g., NIC 116, server 114, client device, etc.) to cryptographically authenticate itself to a DHCP server 122 in order to be assigned an IP address.

At 702, the network device may generate, at a network device, a private key using one-time programmable (OTP) seed parameters stored locally on the network device. In some examples, the OTP seed parameters 210 may be burned into a fuse array 208 of an SoC 310, or other integrated circuit, during manufacturing such that they cannot be changed or tampered with. However, other storage mechanisms may be used to store the OTP seed parameters 210.

At 704, the NIC 116 may populate one or more first Dynamic Host Configuration Protocol (DHCP) packets with authentication data including (i) a unique hardware identifier (ID) 136 associated with a hardware chip in the network device and (ii) a public key ID 134 that indicates a public key 140 corresponding to the private key 130. The one or more first DHCP packets may be a signed DHCP discover packet 132, a signed DHCP request packet 146, and/or both.

At 706, the NIC 116 may sign the one or more first DHCP packets with a signature (e.g., signature 138, signature 150, etc.) using the private key 130 to result in one or more first signed DHCP packets. At 708, the NIC 116 may send the one or more first signed DHCP packets to a DHCP server 122.

At 710, the NIC 116 may receive, from the DHCP server 122, a second DHCP packet (e.g., DHCP Offer Packet 144, DHCP acknowledgement packet 152, etc.) that indicates an IP address assigned to the network device. In such examples, receipt of the second DHCP packet indicates that the DHCP server 122 authenticated the network device by using the public key 140 to verify that the signature was generated using the private key 130.

FIG. 8 illustrates a flow diagram of an example method where a DHCP server uses DHCP packets sent in a DORA process to cryptographically authenticate a NIC 116.

At 802, the DHCP server 122 may receive a list of unique hardware identifiers (IDs) associated with a hardware chips in the network devices that are permitted to be connected to a network associated with the DHCP server.

At 802, the DHCP server 122 may receive, from a network device, one or more first signed DHCP packets with authentication data including (i) a unique hardware identifier (ID) 136 associated with a hardware chip in the network device and (ii) a public key ID 134 that indicates a public key 140 corresponding to the private key 130. The public key 140 and private key 130 may be part of an asymmetric pair of encryption keys.

At 804, the DHCP server 122 may using the public key ID 134, retrieve a public key 140 that corresponds to a private key 130 that was used to sign the one or more first signed DHCP packets.

At 806, the DHCP server 122 may, using the public key 140, verify that a signature (e.g., signature 138, signature 150, etc.) on the one or more first signed DHCP packets was generated using the private key 130. For instance, the signature may generally include or be a mathematical value generated using the private key 130, and the public key 140 may apply the same cryptographic algorithm used to generate the signature 138 in order to validate the signature 138.

At 808, the DHCP server 122 may authenticate the hardware chip by determining that the unique hardware ID 136 is included in the list of unique hardware IDs. The hardware ID listing 142 may generate comprise a list of hardware identifiers for SoCs 310 received form device manufacturers 202 that are expected to be introduced into the data center fabric 120 (or "network").

At 810, the DHCP server 122 may send, to the network device, a second DHCP packet indicating an IP address. The second DHCP packet may be a DHCP Acknowledgement packet 152 that may confirm the successful allocation of network configuration parameters to the client, such as the assigned IP, a subnet mask, a gateway/router IP address, a lease duration, a DNS server IP address, and/or other information.

Figure 9:
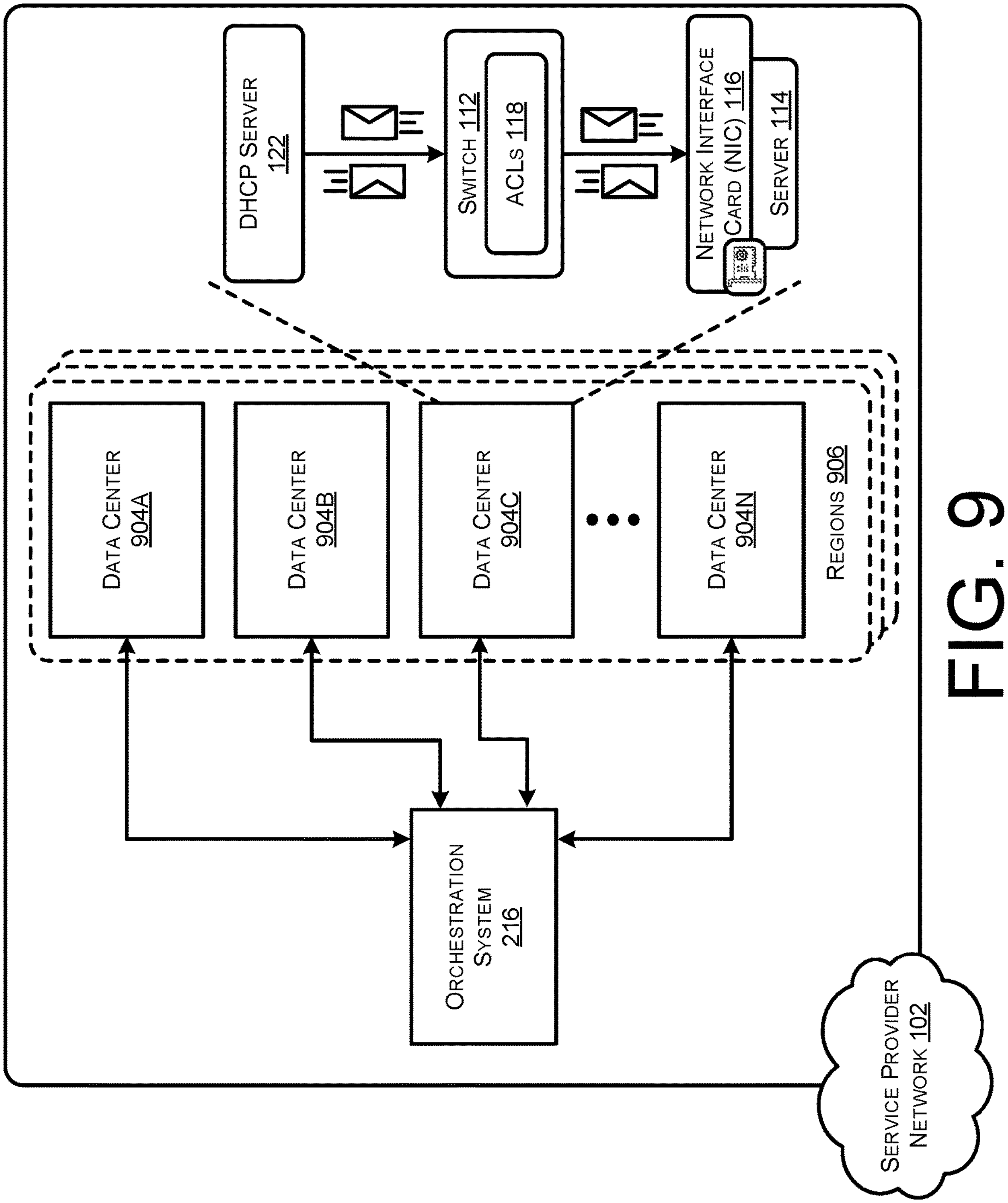
FIG. 9 is a system and network diagram that shows an illustrative operating environment that includes data centers of a service provider network that can be configured to implement aspects of the functionality described herein.

FIG. 9 is a system and network diagram 900 that shows an illustrative operating environment that includes data centers 904 in one or more regions 906 of a service provider network 102 that can be configured to implement aspects of the functionality described herein. The service provider network 102 can provide computing resources, like VM instances and storage, on a permanent or an as-needed basis. Among other types of functionality, the computing resources provided by the service provider network 102 may be utilized to implement the various services described above. As also discussed above, the computing resources provided by the service provider network 102 can include various types of computing resources, such as data processing resources like VM instances, data storage resources, networking resources, data communication resources, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 904A-904N (which might be referred to herein singularly as "a data center 904" or in the plural as "the data centers 904"). The data centers 904 are facilities utilized to house and operate computer systems and associated components. The data centers 904 typically include redundant and backup power, communications, cooling, and security systems. The data centers 904 can also be located in geographically disparate locations, or regions 906. One illustrative embodiment for a data center 904 that can be utilized to implement the technologies disclosed herein will be described below with regard to FIG. 10.

The data centers 904 may be accessible over any wired and/or wireless network(s), which can be a wide area communication network ("WAN"), such as the Internet, an intranet or an Internet service provider ("ISP") network or a combination of such networks. For example, and without limitation, a user of the service provider network 102 may access the service provider network 102 by way of the network(s) 124. It should be appreciated that a local-area network ("LAN"), the Internet, or any other networking topology known in the art that connects the data centers 904 to remote clients and other users can be utilized. It should also be appreciated that combinations of such networks can also be utilized.

Figure 10:
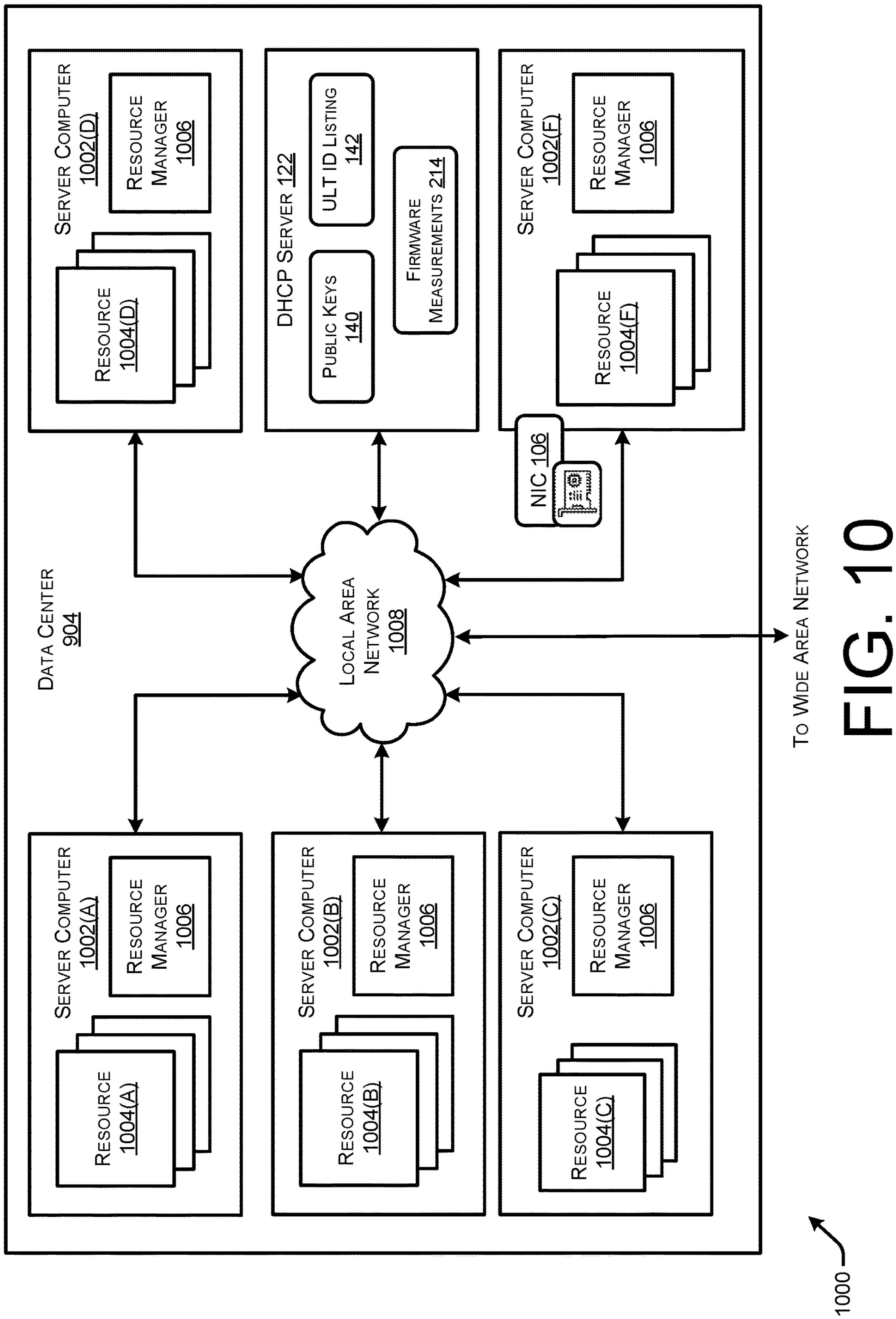
FIG. 10 is a computing system diagram illustrating a configuration for a data center that can be utilized to implement aspects of the technologies disclosed herein.

FIG. 10 is a computing system diagram 1000 that illustrates one configuration for a data center 904 that implements aspects of the technologies disclosed herein. The example data center 904 shown in FIG. 10 includes several server computers 1002A-1002F (which might be referred to herein singularly as "a server computer 1002" or in the plural as "the server computers 1002") for providing computing resources 1004A-1004E. In some examples, the resources 1004 and/or server computers 1002 may include, be included in, or correspond to, the servers 114 described herein.

The server computers 1002 can be standard tower, rack-mount, or blade server computers configured appropriately for providing the computing resources described herein (illustrated in FIG. 10 as the computing resources 1004A-1004E). As mentioned above, the computing resources provided by the service provider network 102 can be data processing resources such as VM instances or hardware computing systems, database clusters, computing clusters, storage clusters, data storage resources, database resources, networking resources, and others. Some of the servers 114 can also be configured to execute a resource manager 1006 capable of instantiating and/or managing the computing resources. In the case of VM instances, for example, the resource manager 1006 can be a hypervisor or another type of program configured to enable the execution of multiple VM instances on a single server computer 1002. Server computers 1002 in the data center 904 can also be configured to provide network services and other types of services.

In the example data center 904 shown in FIG. 10, an appropriate LAN 1008 is also utilized to interconnect the server computers 1002A-1002F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 904A-904N, between each of the server computers 902A-902F in each data center 904, and, potentially, between computing resources in each of the server computers 1002. It should be appreciated that the configuration of the data center 904 described with reference to FIG. 10 is merely illustrative and that other implementations can be utilized.

The data center 904 shown in FIG. 10 also includes a server computer 1002F that can execute some or all of the software components described above. For example, and without limitation, the server computer 1002F (and the other server computers 1002) can generally be included in the server 114 of FIG. 1 and be configured to execute components, including the components of the server 114, the data center fabric 120, the services 126 the service provider network 102, and/or the other software components described above. The server computer 1002F can also be configured to execute other components and/or to store data for providing some or all of the functionality described herein. In this regard, it should be appreciated that the services illustrated in FIG. 10 as executing on the server computer 1002F can execute on many other physical or virtual servers in the data centers 904 in various embodiments.

Figure 11:
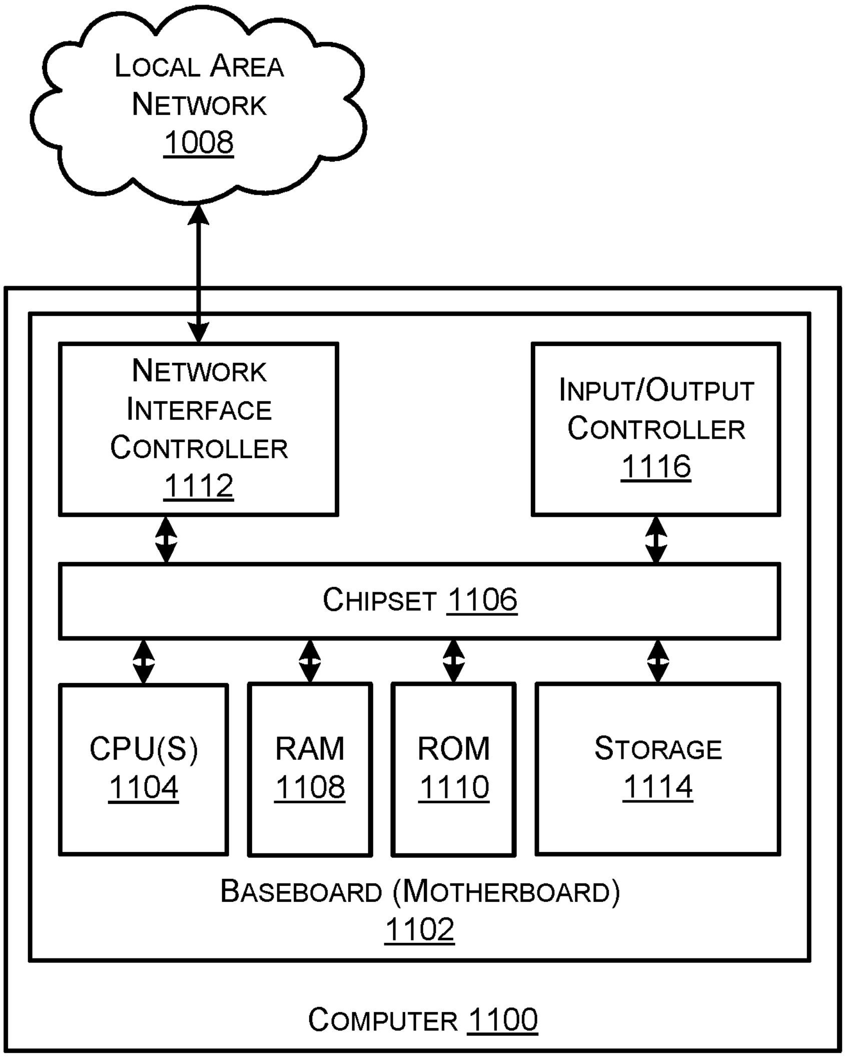
FIG. 11 is a computer architecture diagram showing an illustrative computer hardware architecture for implementing a computing device that can be utilized to implement aspects of the various technologies presented herein.

FIG. 11 shows an example computer architecture for a computer 1100 capable of executing program components for implementing the functionality described above. The computer architecture shown in FIG. 11 illustrates a conventional server computer, workstation, desktop computer, laptop, tablet, network appliance, e-reader, smartphone, or other computing device, and can be utilized to execute any of the software components presented herein. In some examples, the computer 1100 may correspond to, or be the same as or similar to, a NIC 116, a server 114, and/or another device described herein.

The computer 1100 includes a baseboard 1102, or "motherboard," which is a printed circuit board to which a multitude of components or devices can be connected by way of a system bus or other electrical communication paths. In one illustrative configuration, one or more central processing units ("CPUs") 1104 operate in conjunction with a chipset 1106. The CPUs 1104 can be standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 can provide an interface to a RAM 1108, used as the main memory in the computer 1100. The chipset 1106 can further provide an interface to a computer-readable storage medium such as a read-only memory ("ROM") 1110 or non-volatile RAM ("NVRAM") for storing basic routines that help to startup the computer 1100 and to transfer information between the various components and devices. The ROM 1110 or NVRAM can also store other software components necessary for the operation of the computer 1100 in accordance with the configurations described herein.

The computer 1100 can operate in a networked environment using logical connections to remote computing devices and computer systems through a network, such as the network 1008. The chipset 1106 can include functionality for providing network connectivity through a network interface controller (NIC) 1112, such as a gigabit Ethernet adapter. The NIC 1112 is capable of connecting the computer 1100 to other computing devices over the network 1008 (or data center fabric 120 and/or external networks 124). It should be appreciated that multiple NICs 1112 can be present in the computer 1100, connecting the computer to other types of networks and remote computer systems.

The computer 1100 can include storage 1114 (e.g., disk) that provides non-volatile storage for the computer. The storage 1114 can consist of one or more physical storage units. The storage 1114 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 can further read information from the storage 1114 by detecting the physical states or characteristics of one or more particular locations within the physical storage units.

In addition to the storage 1114 described above, the computer 1100 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1100. In some examples, the operations performed by the service provider network 102, and or any components included therein, may be supported by one or more devices similar to computer 1100. Stated otherwise, some or all of the operations performed by the service provider network 102, and or any components included therein, may be performed by one or more computers 1100 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The storage 1114 can store an operating system utilized to control the operation of the computer 1100. According to one embodiment, the operating system comprises the LINUX operating system. According to another embodiment, the operating system comprises the WINDOWS SERVER operating system from MICROSOFT Corporation of Redmond, Washington. According to further embodiments, the operating system can comprise the UNIX operating system or one of its variants. It should be appreciated that other operating systems can also be utilized. The storage 1114 can store other system or application programs and data utilized by the computer 1100.

In one embodiment, the storage 1114, RAM 1108, ROM 1110, and/or other computer-readable storage media may be encoded with computer-executable instructions which, when loaded into the computer 1100, transform the computer from a general-purpose computing system into a special-purpose computer capable of implementing the embodiments described herein. These computer-executable instructions transform the computer 1100 by specifying how the CPUs 1104 transition between states, as described above. According to one embodiment, the computer 1100 has access to computer-readable storage media storing computer-executable instructions which, when executed by the computer 1100, perform the various techniques described above. The computer 1100 can also include computer-readable storage media having instructions stored thereupon for performing any of the other computer-implemented operations described herein.

Generally, the computer 1100 may be an example of a server 114, a switch 112, and other computing devices, etc., described herein. The CPU(s) 1104, RAM 1108, ROM 1110, storage 1114, bandwidth of the NIC 1112, and/or other resources of the computer 1100 may be allocated to one or more different VM instances as described herein based on different VM instance types.

The computer 1100 can also include one or more input/output controllers 1216 for receiving and processing input from a number of input devices, such as a keyboard, a mouse, a touchpad, a touch screen, an electronic stylus, or other type of input device. Similarly, an input/output controller 1216 can provide output to a display, such as a computer monitor, a flat-panel display, a digital projector, a printer, or other type of output device. It will be appreciated that the computer 1100 might not include all of the components shown in FIG. 11, can include other components that are not explicitly shown in FIG. 11, or might utilize an architecture completely different than that shown in FIG. 11.

In some examples, the service provider network 102 may be or comprise a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud provider network can provide on-demand, scalable computing services to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or client.

The cloud provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system associated with a data center network, the system comprising:

a server;

a network interface card (NIC) connected to the server that performs first operations to cryptographically verify itself to a Dynamic Host Configuration Protocol (DHCP) server, the first operations comprising:

generating a private key using one-time programmable (OTP) seed parameters stored in a secure hardware component of a System-on-a-Chip (SoC) of the NIC;

populating a first DHCP Packet with authentication data comprising a hardware identifier (ID) associated with the SoC, and a public key ID (PuK ID) that indicates a public key corresponding to the private key;

signing the first DHCP packet with the private key to result in a first signed DHCP packet;

sending the first signed DHCP packet to the DHCP server; and receiving a second DHCP packet from the DHCP server, the second DHCP packet proposing an Internet Protocol (IP) address for the NIC; and the DHCP server configured to perform second operations comprising:

storing a list of hardware IDs that correspond to SoCs of NICs that are permitted to be connected to the data center network;

identifying the public key using the PuK ID from the first signed DHCP Packet;

verifying the first signed DHCP packet using the public key;

authenticating the SoC of the NIC by determining that the hardware ID is included in the list of hardware IDs; and sending the second DHCP packet to the NIC.

2. The system of claim 1, the operations further comprising:

during a boot process of the SoC, measuring firmware code of the SoC to generate firmware measurement data;

populating the first DHCP packet with the firmware measurement data;

comparing, by the DHCP server, the firmware measurement data with expected firmware measurement data for the SoC; and authenticating, by the DHCP server, the firmware code of the SoC based at least in part on the comparing.

3. The system of claim 1, wherein generating the private key comprises:

by a bootloader and during a boot process of the SoC, deriving the private key using at least the OTP seed parameters of the SoC.

4. The system of claim 1, further comprising:

identifying, by the NIC, a service IP address from the second DHCP packet, the service IP address being associated with a Domain Name Service (DNS) server; and sending, from the NIC, a DNS request to the DNS server using the service IP address.

5. A computer-implemented method comprising:

generating, at a network device, a private key using one-time programmable (OTP) seed parameters stored locally on the network device;

populating one or more first Dynamic Host Configuration Protocol (DHCP) packets with authentication data including (i) a unique hardware identifier (ID) associated with a hardware chip in the network device and (ii) a public key ID that indicates a public key corresponding to the private key;

signing the one or more first DHCP packets with a signature using the private key to result in one or more first signed DHCP packets;

sending the one or more first signed DHCP packets to a DHCP server; and receiving, from the DHCP server, a second DHCP packet that indicates an Internet Protocol (IP) address assigned to the network device, wherein receipt of the second DHCP packet indicates that the DHCP server authenticated the network device by using the public key to verify that the signature was generated using the private key.

6. The computer-implemented method of claim 5, further comprising:

measuring firmware code of the network device to generate firmware measurement data;

populating a third DHCP packet with the firmware measurement data;

signing the third DHCP packet with the private key to result in a signed DHCP Request packet; and sending the third DHCP packet to the DHCP server, wherein receipt of the second DHCP packet indicates that the DHCP server authenticated the firmware code of the network device.

7. The computer-implemented method of claim 5, wherein generating the private key comprises:

by a bootloader and during a boot process of the hardware chip, deriving the private key using at least the OTP seed parameters.

8. The computer-implemented method of claim 5, further comprising:

computing a hash of at least a portion of the one or more first DHCP packets to result in a message digest;

populating the one or more first DHCP packets with the message digest; and signing the message digest with the private key.

9. The computer-implemented method of claim 5, wherein:

the OTP seed parameters are programmed into fuses of the network device by burning the fuses, and the unique hardware ID is burned into the fuses, further comprising extracting the OTP seed parameters and the hardware ID from the fuses.

10. The computer-implemented method of claim 9, wherein the second DHCP packet is a DHCP Offer packet signed with a signature generated using a second private key associated with the DHCP server, further comprising:

using a second public key corresponding to the second private key, verifying that the signature on the DHCP Offer packet was generated using the second private key associated with the DHCP server.

11. The computer-implemented method of claim 5, wherein:

the one or more first DHCP packets comprise a DHCP Discover packet that is populated with the authentication data;

receiving the second DHCP packet includes receiving a DHCP Offer packet and receipt of the DHCP Offer packet indicates that the DHCP server authenticated hardware of the network device; and the one or more first DHCP packets further comprise a DHCP Request packet that is populated with the authentication data and with firmware measurement data indicating a measurement of firmware code of the network device;

further comprising:

receiving a DHCP Acknowledgement packet that indicates the IP address is assigned to the network device, the receipt of the DHCP Offer packet indicating that the DHCP server authenticated the firmware code of the network device.

12. The computer-implemented method of claim 5, wherein the network device and the DHCP server are connected to a data center network, further comprising:

identifying, at the network device, a service IP address from the second DHCP packet, the service IP addresses including a service IP address associated with a Domain Name Service (DNS) server; and sending a DNS request to the DNS server based at least in part on the second DHCP packet including the service IP addresses.

13. A Dynamic Host Configuration Protocol (DHCP) server configured to cryptographically verify network devices that request Internet Protocol (IP) addresses, the DHCP server comprising:

one or more processors; and one or more computer-readable media storing computer-executable instructions that, when executed by one or more processors, cause the one or more processors to perform operations comprising:

receiving a list of unique hardware identifiers (IDs) associated with a hardware chips in the network devices that are permitted to be connected to a network associated with the DHCP server;

receiving, from a network device, one or more first signed DHCP packets with authentication data including (i) a unique hardware identifier (ID) associated with a hardware chip in the network device and (ii) a public key ID that indicates a public key corresponding to a private key used to sign the one or more first signed DHCP packets;

using the public key ID, retrieving the public key that corresponds to a private key that was used to sign the one or more first signed DHCP packets;

using the public key, verifying that a signature on the one or more first signed DHCP packets was generated using the private key;

authenticating the hardware chip by determining that the unique hardware ID is included in the list of unique hardware IDs; and sending, to the network device, a second DHCP packet indicating an IP address.

14. The DHCP server of claim 13, the operations further comprising:

receiving, in the one or more first DHCP packets, firmware measurement data indicating measurements of firmware code of the hardware chip, the firmware measurement data being signed using the private key;

comparing the firmware measurement data with expected firmware measurement data for the hardware chip; and authenticating the firmware code of the hardware based at least in part on the comparing and on the firmware measurement data being signed using the private key.

15. The DHCP server of claim 13, the operations further comprising:

based at least in part on authenticating the hardware chip, determining to provide the network device with service IP addresses for services associated with the network; and populating the second DHCP packet with a service IP address being associated with a Domain Name Service (DNS) server.

16. The DHCP server of claim 13, the operations further comprising:

signing the second DHCP packet with a second signature using a second private key that is associated with the DHCP server, wherein the network device accesses a second public key that corresponds to the second private key and is usable to verify the second signature.

17. The DHCP server of claim 13, wherein:

the one or more first DHCP packets comprise a DHCP Discover packet that is populated with the authentication data;

sending the second DHCP packet includes sending a DHCP Offer packet indicating that the DHCP server authenticated hardware of the network device;

the one or more first DHCP packets further comprise a DHCP Request packet that is populated with firmware measurement data indicating a measurement of firmware code of the network device, the firmware measurement data being signed using the private key;

further comprising:

using the public key, verifying the firmware measurement data was signed using the private key;

authenticating the firmware code based at least in part on the firmware measurement data being signed using the private key; and sending a DHCP Acknowledgement packet that indicates the IP address is assigned to the network device.

18. The DHCP server of claim 13, wherein:

the unique hardware ID is burned into fuses of the network device; and the list of unique hardware identifiers (IDs) is a list of hardware IDs for the hardware chips in the network devices that are permitted to be connected to a network associated with the DHCP server.

19. The DHCP server of claim 13, the operations further comprising:

determining that a media access control (MAC) address associated with the network device was signed with the signature in the one or more first signed DHCP packets such that the MAC address was not spoofed by an intermediate device; and creating a static binding between the MAC address and the IP address.

20. The DHCP server of claim 13, wherein the private key is generated by a bootloader of the network device, during a boot process of the hardware chip, and using at least one-time programmable (OTP) seed parameters stored at the network device.

* * * * *